US009451282B2

(12) United States Patent
Kim et al.

(10) Patent No.: US 9,451,282 B2
(45) Date of Patent: *Sep. 20, 2016

(54) METHOD AND APPARATUS FOR MOTION VECTOR DETERMINATION IN VIDEO ENCODING OR DECODING

(71) Applicant: SAMSUNG ELECTRONICS CO., LTD., Suwon-si (KR)

(72) Inventors: Il-koo Kim, Osan-si (KR); Young-o Park, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/632,673

(22) Filed: Feb. 26, 2015

(65) Prior Publication Data

US 2015/0172703 A1    Jun. 18, 2015

Related U.S. Application Data

(63) Continuation of application No. 14/357,043, filed as application No. PCT/KR2012/009408 on Nov. 8, 2012.

(60) Provisional application No. 61/557,133, filed on Nov. 8, 2011.

(51) Int. Cl.
  *H04N 19/51* (2014.01)
  *H04N 19/56* (2014.01)
  (Continued)

(52) U.S. Cl.
  CPC ............ *H04N 19/56* (2014.11); *H04N 19/124* (2014.11); *H04N 19/176* (2014.11);
  (Continued)

(58) Field of Classification Search
  CPC .................. H04N 19/00684; H04N 19/00587
  See application file for complete search history.

(56) References Cited

U.S. PATENT DOCUMENTS

| 5,926,225 A | 7/1999 | Fukuhara et al. |
| 7,394,853 B2 | 7/2008 | Kondo et al. |

(Continued)

FOREIGN PATENT DOCUMENTS

| CN | 1518834 | 8/2004 |
| CN | 1665305 A | 9/2005 |

(Continued)

OTHER PUBLICATIONS

Communication dated May 15, 2014 issued by the Korean Intellectual Property Office in counterpart Korean Application No. 10-2012-0126170.

(Continued)

*Primary Examiner* — Mohammed Rahaman
(74) *Attorney, Agent, or Firm* — Sughrue Mion, PLLC

(57) ABSTRACT

Provided are motion vector determining method and apparatus for determining a motion vector via motion vector prediction. The motion vector determining method involves determining a candidate motion vector list comprising motion vectors of a plurality of candidate blocks referred so as to predict a motion vector of a current block, when a reference image of a first candidate block from among the plurality of candidate blocks is different from a reference image of the current block, determining whether or not to use a motion vector of the first candidate block from the candidate motion vector list, based on whether each of the reference image of the current block and the reference image of the first candidate block is a short-term reference image or a long-term reference image, and determining the motion vector of the current block by using a candidate motion vector selected from among the motion vectors comprised in the candidate motion vector list.

1 Claim, 21 Drawing Sheets

(51) Int. Cl.
  *H04N 19/52* (2014.01)
  *H04N 19/513* (2014.01)
  *H04N 19/61* (2014.01)
  *H04N 19/124* (2014.01)
  *H04N 19/573* (2014.01)
  *H04N 19/58* (2014.01)
  *H04N 19/577* (2014.01)
  *H04N 19/176* (2014.01)

(52) U.S. Cl.
  CPC ........... *H04N 19/513* (2014.11); *H04N 19/52* (2014.11); *H04N 19/573* (2014.11); *H04N 19/577* (2014.11); *H04N 19/58* (2014.11); *H04N 19/61* (2014.11)

(56) References Cited

U.S. PATENT DOCUMENTS

| | | |
|---|---|---|
| 7,643,556 B2 | 1/2010 | Jeon |
| 7,940,845 B2 | 5/2011 | Kondo et al. |
| 8,559,515 B2 | 10/2013 | Ha |
| 8,750,372 B2 | 6/2014 | Leontaris et al. |
| 8,923,399 B2 | 12/2014 | Yang |
| 9,031,132 B2 | 5/2015 | Kondo et al. |
| 9,106,889 B2 | 8/2015 | Jeon |
| 9,124,890 B2 | 9/2015 | Jeon |
| 9,241,161 B2 | 1/2016 | Kondo et al. |
| 2003/0202605 A1 | 10/2003 | Hazra et al. |
| 2003/0206589 A1 | 11/2003 | Jeon |
| 2004/0136461 A1* | 7/2004 | Kondo et al. ............ 375/240.16 |
| 2004/0146109 A1 | 7/2004 | Kondo et al. |
| 2005/0129117 A1 | 6/2005 | Jeon |
| 2006/0245498 A1 | 11/2006 | Lee et al. |
| 2009/0002379 A1 | 1/2009 | Baeza et al. |
| 2009/0074073 A1 | 3/2009 | Srinivasan et al. |
| 2009/0086814 A1 | 4/2009 | Leontaris et al. |
| 2009/0175334 A1 | 7/2009 | Ye et al. |
| 2009/0196342 A1 | 8/2009 | Divorra Escoda et al. |
| 2011/0096829 A1 | 4/2011 | Han et al. |
| 2012/0121015 A1 | 5/2012 | Yang |
| 2013/0107963 A1* | 5/2013 | Wahadaniah et al. ... 375/240.16 |
| 2013/0301728 A1 | 11/2013 | Wahadaniah et al. |
| 2014/0177715 A1 | 6/2014 | Jeon |
| 2014/0177719 A1 | 6/2014 | Jeon |
| 2014/0198849 A1 | 7/2014 | Jeon |
| 2014/0334550 A1 | 11/2014 | Lee et al. |
| 2015/0049808 A1 | 2/2015 | Jeon |
| 2016/0014427 A1 | 1/2016 | Jeon |

FOREIGN PATENT DOCUMENTS

| | | |
|---|---|---|
| CN | 1767646 A | 5/2006 |
| CN | 1767647 A | 5/2006 |
| CN | 101371571 A | 2/2009 |
| CN | 101375594 A | 2/2009 |
| CN | 101656882 A | 2/2010 |
| CN | 1784008 B | 4/2010 |
| CN | 101855911 A | 10/2010 |
| CN | 101248669 B | 1/2011 |
| JP | 2003-333602 A | 11/2003 |
| JP | 2006-222985 A | 8/2006 |
| JP | 2008-245016 A | 10/2008 |
| JP | 2011-507314 A | 3/2011 |
| KR | 10-2005-0039803 A | 4/2005 |
| KR | 10-0506866 B1 | 8/2005 |
| KR | 10-2006-0078290 A | 7/2006 |
| KR | 10-2008-0016916 A | 2/2008 |
| KR | 10-2008-0077942 A | 8/2008 |
| KR | 102009-0113281 A | 10/2009 |
| RU | 2395174 C1 | 7/2010 |
| TW | 201114264 | 4/2011 |
| WO | 2007-081176 A1 | 7/2007 |
| WO | 2008/091117 A1 | 7/2008 |
| WO | 2009-045682 A3 | 4/2009 |
| WO | 2010/041855 A2 | 4/2010 |
| WO | 2011/109247 A1 | 9/2011 |
| WO | 2013/061551 A1 | 5/2013 |

OTHER PUBLICATIONS

Communications dated Feb. 19, 2013 issued by the International Searching Authority in counterpart International Application No. PCT/KR2012/009408 (PCT/ISA/210 & 237).
Communication, Issued by the Korean Intellectual Property Office, dated Dec. 10, 2014, in counterpart Korean Application No. 10-2014-0054461.
Communication issued on Jun. 4, 2015 by the Australian Intellectual Patent Office in related Application No. 2015201551.
Communication issued on Jun. 5, 2015 by the Australian Intellectual Patent Office in related Application No. 2015201550.
Communication issued on Jun. 5, 2015 by the Australian Intellectual Patent Office in related Application No. 2015201549.
Communication issued on Jun. 5, 2015 by the Australian Intellectual Patent Office in related Application No. 2015201552.
Communication issued on Jun. 16, 2015 by the Japanese Patent Office in related Application No. 2014-540946.
Communication issued on Jun. 16, 2015 by the Japanese Patent Office in related Application No. 2015-079403.
Communication issued on Aug. 6, 2015 by the Russian Patent Office in related Application No. 2015115002/08(023458).
Communication issued on Aug. 6, 2015 by the Russian Patent Office in related Application No. 2015114969/08(023423).
Communication issued on Aug. 6, 2015 by the Russian Patent Office in related Application No. 2015114980/08(023434).
Communication issued on Aug. 6, 2015 by the Russian Patent Office in related Application No. 2015114988/08(023442).
Kim et al., "Restriction on motion vector scaling for Merge and AMVP", Joint Collaborative Team on Video Coding (JCT-VC) of ITU-T SG16 WP3and ISO/IEC JTC1/SC29/WG11, 7th Meeting, Nov. 11, 2011, 4 total pages.
Communication dated Aug. 19, 2015 issued by Taiwan Intellectual Property Office in counterpart Taiwan Application No. 104114733.
Communication dated Sep. 8, 2015 issued by Taiwan Intellectual Property Office in counterpart Taiwan Patent Application No. 104114742.
Communication dated Sep. 1, 2015 issued by Korean Intellectual Property Office in counterpart Korean Patent Application No. 10-2015-0025920.
Communication dated Sep. 1, 2015 issued by Korean Intellectual Property Office in counterpart Korean Patent Application No. 10-2014-0148740.
Communication dated Sep. 1, 2015 issued by Korean Intellectual Property Office in counterpart Korean Patent Application No. 10-2015-0025921.
Communication dated Sep. 4, 2015 issued by European Patent Office in counterpart European Patent Application No. 15163868.1.
Lim et al., "High-level Syntax: MVP scaling issue for LTRPs", JCT-VC of ITU-T SG 16 WP 3 and ISO/IEC JTC 1/SC/ 29/WG 11 9th Meeting, Apr. 27-May 7, 2012, 3 pages total, Panasonic Corporation, Geneva, CH, JCTVC-I0422.
Takahashi et al., "High-level Syntax: Motion vector prediction issue for long-term reference picture", JCT-VC of ITU-T SG 16 WP 3 and ISO/IEC JTC 1/SC 29/WG 11 10th Meeting, Jul. 11-20, 2012, 6 pages total, Stockholm, SE, JCTVC-J0071.
Tourapis et al., "AHG Report: B picture and ABP Finalization", JVT of ISO/IEC MPEG & ITU-T VCEG 5th Meeting, Oct. 9-17, 2002, 2 pages total, Microsoft, LG Electronics, and Toshiba, Geneva, Switzerland, JVT-E018.
I-K Kim et al., "Restricted usage of motion vectors for long-term reference picture in motion vector prediction process", JCT-VC of ITU-T SG 16 WP 3 and ISO/IEC JTC 1/SC 29/WG 11, 10th Meeting, Jul. 11-20, 2012, 13 pages total, Samsung Electronics Co., Ltd., Stockholm, SE, JCTVC-J0302.
Chen et al., "MVP index parsing with fixed number of candidates", JCT-VC of ITU-T SG16 WP3 and ISO/IEC JTC1/SC29/WG11 6th Meeting, Jul. 14-22, 2011, 14 pages total, Samsung Electronics Co., Ltd., Torino, IT, JCTVC-F402.

(56) References Cited

OTHER PUBLICATIONS

Communication dated Sep. 8, 2015 issued by European Patent Office in counterpart European Patent Application No. 12848529.9.
I-K Kim et al., "HM7: High Efficiency Video Coding (HEVC) Test Model 7 Encoder Description", JCT-VC of ITU-T SG16 WP3 and ISO/IEC JTC1/SC29/WG11 9th Meeting, Apr. 27-May 7, 2012, 42 pages total, Geneva, CH, JCTVC-I1002.
Communication dated Sep. 16, 2015 issued by European Patent Office in counterpart European Patent Application No. 15163909.3.
Communication dated Sep. 16, 2015 issued by European Patent Office in counterpart European Patent Application No. 15164427.5.
Communication dated Sep. 16, 2015 issued by European Patent Office in counterpart European Patent Application No. 15164428.3.
Communication dated Sep. 16, 2015 issued by European Patent Office in counterpart European Patent Application No. 15164430.9.
I-K Kim et al., "HM7: High Efficiency Video Coding (HEVC) Test Model 8 Encoder Description", JCT-VC of ITU-T SG16 WP3 and ISO/IEC JTC1/SC29/WG11 10th Meeting, Jul. 11-20, 2012, 36 pages total, Stockholm, SE, JCTVC-J1002.
Bross et al., "High efficiency video coding (HEVC) text specification draft 8", JCT-VC of ITU-T SG 16 WP 3 and ISO/IEC JTC1/SC29/WG11, Jul. 11-20, 2012, 285 pages total, Stockholm, SE, JCTVC-J1003.
Communication issued Nov. 27, 2015, issued by the State Intellectual Property Office of the People's Republic of China in counterpart Chinese Patent Application No. 201510161074.8.
Communication issued Dec. 3, 2015, issued by the State Intellectual Property Office of the People's Republic of China in counterpart Chinese Patent Application No. 201510161050.2.
Communication issued Nov. 13, 2015, issued by the State Intellectual Property Office of the People's Republic of China in counterpart Chinese Patent Application No. 201510162074.X.
Communication issued Dec. 3, 2015, issued by the State Intellectual Property Office of the People's Republic of China in counterpart Chinese Patent Application No. 201510161048.5.
Communication issued Mar. 1, 2016, issued by the Japanese Patent Office in counterpart Japanese Patent Application No. 2014-540946.
Communication issued Mar. 1, 2016, issued by the Japanese Patent Office in counterpart Japanese Patent Application No. 2015-079403.
Communication issued Mar. 1, 2016, issued by the Taiwanese Intellectual Property Office in counterpart Taiwanese Patent Application No. 101141663.
Communication dated Jul. 15, 2016, issued by the State Intellectual Property Office of P.R. China in counterpart Chinese Application No. 201280054956.9.
Communication dated Jun. 28, 2016, issued by the Japanese Patent Office in counterpart Japanese Application No. 2015-079404.
Communication dated Jun. 28, 2016, issued by the Japanese Patent Office in counterpart Japanese Application No. 2015-079405.
Communication dated Jun. 28, 2016, issued by the Japanese Patent Office in counterpart Japanese Application No. 2015-079406.

* cited by examiner

CODING UNIT (1010)

PREDICTION UNIT (1060)

METHOD AND APPARATUS FOR MOTION VECTOR DETERMINATION IN VIDEO ENCODING OR DECODING

CROSS-REFERENCE TO RELATED APPLICATIONS

This application is a continuation application of U.S. patent application Ser. No. 14/357,043, filed on May 8, 2014 in the U.S. Patent and Trademark Office, which is a National Stage application under 35 U.S.C. §371 of International Application No. PCT/KR2012/009408, filed on Nov. 8, 2012, which claims the benefit of U.S. Provisional Application No. 61/557,133, filed on Nov. 8, 2011 in the U.S. Patent and Trademark Office, the disclosures of which are incorporated herein in their entirety by reference.

TECHNICAL FIELD

The present invention relates to video encoding and decoding, and more particularly, to video encoding and decoding in which inter prediction and/or motion compensation is performed.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a macroblock having a predetermined size.

Image data of a spatial region is transformed into coefficients of a frequency region via frequency transformation. According to a video codec, an image is split into blocks having a predetermined size, discrete cosine transformation (DCT) is performed for each respective block, and frequency coefficients are encoded in block units, for rapid calculation of frequency transformation. Compared with image data of a spatial region, coefficients of a frequency region are easily compressed. In particular, since an image pixel value of a spatial region is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

According to a multi-view video code, a base view video and one or more additional view videos are encoded and decoded. By removing temporal/spatial redundancy between the base view video and the additional view video and redundancy between views, an amount of data of the base view video and the additional view video can be reduced.

DETAILED DESCRIPTION OF THE INVENTION

Technical Problem

The present invention provides a motion vector determining method and apparatus performed via motion vector prediction, a method and apparatus for encoding a video by performing inter prediction and motion compensation via motion vector prediction, and a method and apparatus for decoding a video by performing motion compensation via motion vector prediction.

Technical Solution

According to an aspect according to the present invention, there is provided a motion vector determining method for inter prediction, the motion vector determining method including operations of determining a candidate motion vector list comprising motion vectors of a plurality of candidate blocks referred so as to predict a motion vector of a current block; when a reference image of a first candidate block from among the plurality of candidate blocks is different from a reference image of the current block, determining whether or not to use a motion vector of the first candidate block from the candidate motion vector list, based on whether each of the reference image of the current block and the reference image of the first candidate block is a short-term reference image or a long-term reference image; and determining the motion vector of the current block by using a candidate motion vector selected from among the motion vectors comprised in the candidate motion vector list.

Advantageous Effects

When a method of determining a motion vector according to one or more embodiments of the present invention is performed, in a case where a reference image indicated by a reference index of a candidate block is different from a reference image of a current block, and at least one of the reference images of the current block and the candidate block is a long-term reference image, it is possible to skip a process of scaling a size of a motion vector of the candidate block or a process of referring to the motion vector of the candidate block, and is possible to control the current block to refer to a motion vector of another candidate block having a relatively high prediction accuracy, whereby an efficiency of a motion vector prediction process may be improved.

BEST MODE

Figure 1:
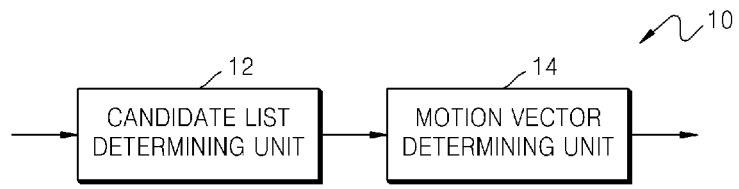
FIG. 1 is a block diagram of a motion vector determining apparatus according to an embodiment according to the present invention.

According to an aspect according to the present invention, there is provided a motion vector determining method for inter prediction, the motion vector determining method including operations of determining a candidate motion vector list comprising motion vectors of a plurality of candidate blocks referred so as to predict a motion vector of a current block; when a reference image of a first candidate block from among the plurality of candidate blocks is different from a reference image of the current block, determining whether or not to use a motion vector of the first candidate block from the candidate motion vector list, based on whether each of the reference image of the current block and the reference image of the first candidate block is a short-term reference image or a long-term reference image; and determining the motion vector of the current block by using a candidate motion vector selected from among the motion vectors comprised in the candidate motion vector list.

The first candidate block may be a neighboring block of the current block in a current image of the current block or may be a collocated block at the same position as the current block in an image that is restored earlier than the current image.

When all of the reference image of the current block and the reference image of the first candidate block are the long-term reference images, the operation of determining whether or not to use the motion vector may include an operation of maintaining the motion vector of the first candidate block in the candidate motion vector list.

When one of the reference image of the current block and the reference image of the first candidate block is the short-term reference image, and the other one of the reference image of the current block and the reference image of the first candidate block is the long-term reference image, the operation of determining whether or not to use the motion vector may include an operation of determining not to use the motion vector of the first candidate block in the candidate motion vector list.

According to another aspect according to the present invention, there is provided a motion vector determining apparatus for inter prediction, the motion vector determining apparatus including a candidate list determining unit for determining a candidate motion vector list comprising motion vectors of a plurality of candidate blocks referred so as to predict a motion vector of a current block and, when a reference image of a first candidate block from among the plurality of candidate blocks is different from a reference image of the current block, for determining whether or not to use a motion vector of the first candidate block from the candidate motion vector list, based on whether each of the reference image of the current block and the reference image of the first candidate block is a short-term reference image or a long-term reference image; and a motion vector determining unit for determining the motion vector of the current block by using a candidate motion vector selected from among the motion vectors comprised in the candidate motion vector list.

According to another aspect according to the present invention, there is provided a computer-readable recording medium having recorded thereon a computer program for executing the motion vector determining method.

MODE OF THE INVENTION

Hereinafter, a motion vector determining apparatus 10 and a motion vector determining method will be described with reference to FIGS. 1 through 4. Also, methods and apparatuses for encoding and decoding a video by performing the motion vector determining method will be described with reference to FIGS. 5 and 8. In addition, video encoding and decoding schemes including a motion vector determining method, based on coding units having a tree structure will be described with reference to FIGS. 9 through 21. Hereinafter, the term 'image' may refer to a still image or a moving picture, that is, a video itself.

First, the motion vector determining apparatus 10 and the motion vector determining method will be described with reference to FIGS. 1 through 4. Also, the methods and apparatuses for encoding and decoding a video by performing the motion vector determining method will be described with reference to FIGS. 5 and 8.

FIG. 1 is a block diagram of the motion vector determining apparatus 10 according to an embodiment according to the present invention.

The motion vector determining apparatus 10 includes a candidate list determining unit 12 and a motion vector determining unit 14.

Inter prediction is performed by using a similarity between a current image and another image. In a reference image that is restored earlier than the current image, a reference region that is similar to a current region of the current image is detected. A distance between coordinates of the current region and the reference region is represented as a motion vector, and a difference between pixel values of the current region and the reference region is represented as residual data. Thus, by performing the inter prediction on the current region, it is possible to output an index indicating the reference image, the motion vector, and the residual data, instead of directly outputting image information about the current region.

The motion vector determining apparatus 10 may perform the inter prediction on each video image for each respective block. A block may have a square shape, a rectangular shape, or any geometric shape and is not limited to a data unit having a predetermined size. According to an embodiment according to the present invention, a block may be a maximum coding unit, a coding unit, a prediction unit, a transformation unit, or the like from among coding units according to a tree structure. Video encoding and decoding methods based on coding units according to a tree structure will be described below with reference to FIGS. 9 through 21.

The reference image that is used in the inter prediction of the current image has to be an image that is decoded earlier than the current image. In the present embodiment, the reference image for the inter prediction may be classified into a short-term reference image and a long-term reference image. A decoded picture buffer (DPB (not shown)) stores restored images that are generated via motion compensation on previous images. The restored images that are previously generated may be used as the reference image for inter prediction of other images. Thus, in order to perform the inter prediction of the current image, at least one short-term reference image or at least one long-term reference image may be selected from the restored images stored in the decoded picture buffer. The short-term reference image may be an image that is just or recently decoded in a decoding order including the current image, whereas the long-term reference image may be an image that is decoded much earlier than the current image, is selected to be used as a reference image for the inter prediction of other images, and thus is stored in the decoded picture buffer.

For motion vector prediction, PU merging, or advanced motion vector prediction (AMVP), motion vector prediction of the current block may be determined by referring to a motion vector of another block.

The motion vector determining apparatus 10 may determine a motion vector by referring to a motion vector of another block that is temporally or spatially adjacent to the current block. The motion vector determining apparatus 10 may determine a candidate motion vector list including a plurality of motion vectors of candidate blocks that may become reference targets for the motion vector of the current block. The motion vector determining apparatus 10 may determine the motion vector of the current block by referring to a motion vector selected from the candidate motion vector list.

In the present embodiment, a candidate block may indicate a neighboring block of the current block in the current image or may be a collocated block that is at the same position as the current block in an image restored earlier than the current image.

The candidate list determining unit 12 may scale sizes of candidate motion vectors that satisfy a predetermined condition and that are from the candidate motion vector list including the motion vectors of the candidate blocks that are referred for prediction of the motion vector of the current block, or may exclude the candidate motion vectors from the candidate motion vector list.

When a reference image of a first candidate block from among the candidate blocks included in the candidate motion vector list is different from the reference image of the current block, the candidate list determining unit 12 may determine whether each of the reference image of the current block and the reference image of the first candidate block is the short-term reference image or the long-term reference image. The candidate list determining unit 12 may determine how to use a motion vector of the first candidate block in the candidate motion vector list, based on whether each of the reference image of the current block and the reference image of the first candidate block is the short-term reference image or the long-term reference image.

When all of the reference image of the current block and the reference image of the first candidate block are the long-term reference images, the candidate list determining unit 12 may maintain the motion vector of the first candidate block in the candidate motion vector list. That is, the first candidate block may be included in the candidate motion vector list while a size of the motion vector of the first candidate block is not scaled.

When one of the reference image of the current block and the reference image of the first candidate block is the short-term reference image, and the other one of the reference image of the current block and the reference image of the first candidate block is the long-term reference image, the candidate list determining unit 12 may determine not to use the motion vector of the first candidate block in the candidate motion vector list. Then, the motion vector of the first candidate block may be declared as a non-usable motion vector.

When all of the reference image of the current block and the reference image of the first candidate block are the short-term reference images, the candidate list determining unit 12 may scale the size of the motion vector of the first candidate block and may include the scaled motion vector of the first candidate block in the candidate motion vector list. In this case, the candidate list determining unit 12 may scale the size of the motion vector of the first candidate block based on a ratio of a distance between the current image and the reference image of the current block to a distance between an image of the first candidate block and a reference image of the first candidate block, and may update a value of the motion vector of the first candidate block as a scaled value in the candidate motion vector list.

The motion vector determining unit 14 may select a candidate motion vector from the motion vectors included in the candidate motion vector list and may determine the motion vector of the current block by using the selected candidate motion vector. The motion vector determining unit 14 may determine the motion vector of the current block by duplicating the candidate motion vector without a change or by modifying the candidate motion vector.

Figure 2:
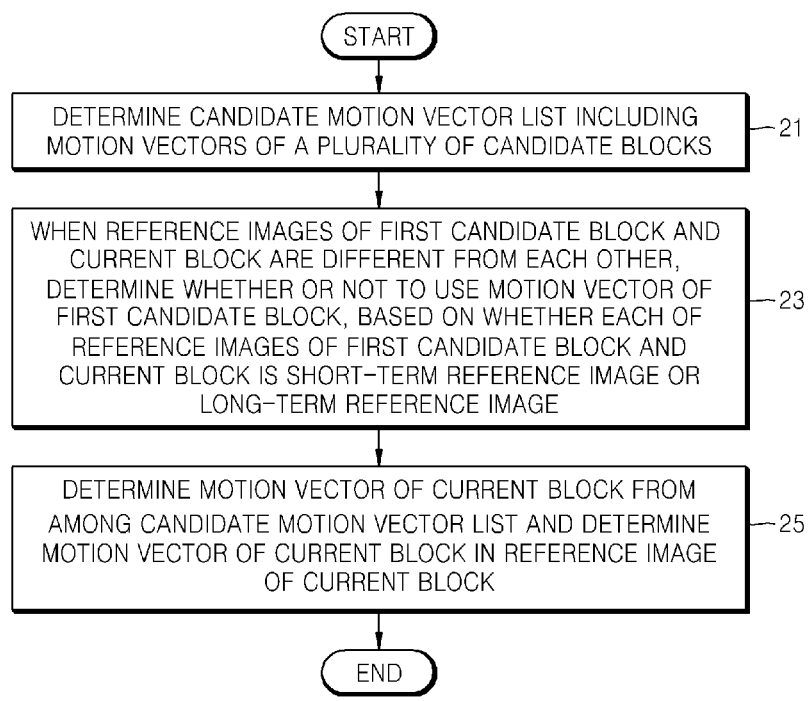
FIG. 2 is a flowchart of a motion vector determining method, according to an embodiment of the present invention.

FIG. 2 is a flowchart of a motion vector determining method, according to an embodiment of the present invention.

The motion vector determining apparatus 10 may predict a motion vector of a current block by using a motion vector of a block that is temporally or spatially close to the current block. Also, the motion vector determining apparatus 10 may determine a plurality of candidate blocks having predictable motion vectors, may select a candidate block from among the candidate blocks, may refer to a motion vector of the selected candidate block, and thus may determine the motion vector of the current block.

However, when a reference image indicated by a reference index of a candidate block from among the candidate blocks is different from a reference image of the current block, if the motion vector determining apparatus 10 predicts the motion vector of the current block by referring to a motion vector of the candidate block, an accuracy of the predicted motion vector may deteriorate although a size of the motion vector of the candidate block is scaled and then the motion vector of the candidate block is referred to. Thus, when the reference image of the current block is different from the reference image of the candidate block, the motion vector determining apparatus 10 may determine whether to refer to the candidate block after scaling the size of the motion vector of the candidate block or may determine not to refer to the candidate block.

Hereinafter, when the reference image of the current block is different from the reference image of the candidate block, a method of predicting, by the motion vector determining apparatus 10, the motion vector of the current block from the motion vector of the candidate block is described in detail with reference to operations 21, 23, and 25.

In operation 21, the motion vector determining apparatus 10 determines a candidate motion vector list including motion vectors of a plurality of candidate blocks for the current block.

In operation 23, when a reference image of a first candidate block from among the candidate blocks is different from the reference image of the current block, the motion vector determining apparatus 10 determines whether or not to use a motion vector of the first candidate block from the candidate motion vector list, based on whether each of the reference image of the current block and the reference image of the first candidate block is a short-term reference image or a long-term reference image.

The motion vector determining apparatus 10 may determine whether the reference image of the current block is the long-term reference image, by using a long-term reference index indicating whether the reference image of the current block is the long-term reference image. Similarly, the motion vector determining apparatus 10 may determine whether the reference image of the first candidate block is the long-term reference image, by using a long-term reference index of the first candidate block.

In another embodiment, when a value of a difference between picture order counts (POCs) of the reference image of the current block and the reference image of the first candidate block is greater than a first threshold value, the motion vector determining apparatus 10 may determine that the reference image of the first candidate block is the long-term reference image. Similarly, when the value of the difference between the POCs of the reference image of the current block and the reference image of the first candidate block is greater than a second threshold value, the motion vector determining apparatus 10 may determine that the reference image of the current block is the long-term reference image.

In operation 25, the motion vector determining apparatus 10 determines the motion vector of the current block by using a candidate motion vector selected from the motion vectors included in the candidate motion vector list.

In operation 25, regardless of whether the reference image of the current block is the short-term reference image or the long-term reference image, the motion vector determining apparatus 10 may determine a reference block indicated by the motion vector of the current block that is determined in the reference image of the current block according to a POC indicated by a reference index of the current block.

In operation 23, when all of the reference image of the current block and the reference image of the first candidate block are the long-term reference images, the motion vector determining apparatus 10 may maintain the motion vector of the first candidate block in the candidate motion vector list without scaling a size of the motion vector of the first candidate block. When one of the reference image of the current block and the reference image of the first candidate block is the short-term reference image, and the other one of the reference image of the current block and the reference image of the first candidate block is the long-term reference image, the motion vector determining apparatus 10 may determine not to use the motion vector of the first candidate block in the candidate motion vector list. When all of the reference image of the current block and the reference image of the first candidate block are the short-term reference images, the motion vector determining apparatus 10 may update the motion vector of the first candidate block in the candidate motion vector list, according to the motion vector of the first candidate block which is size-scaled based on a ratio of a distance between the current image and the reference image of the current block to a distance between an image of the first candidate block and a reference image of the first candidate block.

By performing operations 21, 23, and 25, the motion vector determining apparatus 10 may re-determine the candidate motion vector list. When only one of the reference image of the current block and the reference image of the first candidate block is the long-term reference image, the motion vector determining apparatus 10 may exclude the motion vector of the first candidate block from the candidate motion vector list and thus may not use the first candidate block as a reference target. Thus, the motion vector determining apparatus 10 may determine the motion vector of the candidate block by referring to another motion vector included in the candidate motion vector list.

When all of the reference image of the current block and the reference image of the first candidate block are the long-term reference images, the motion vector determining apparatus 10 includes the motion vector of the first candidate block in the candidate motion vector list without scaling a size of the motion vector of the first candidate block. Thus, the motion vector determining apparatus 10 may select an optimal reference motion vector from among the other candidate motion vector and the motion vector of the first candidate block included in the candidate motion vector list and may determine the motion vector of the current block by using the selected reference motion vector.

When all of the reference image of the current block and the reference image of the first candidate block are the short-term reference images, the motion vector determining apparatus 10 may scale the size of the motion vector of the first candidate block and may include the motion vector of the first candidate block in the candidate motion vector list. Thus, the motion vector determining apparatus 10 may select an optimal reference motion vector from among the other candidate motion vector and the size-scaled motion vector of the first candidate block included in the candidate motion vector list and may determine the motion vector of the current block by using the selected reference motion vector.

Thus, according to the motion vector determining apparatus 10 and the motion vector determining method described above with reference to FIGS. 1 and 2, when the reference image indicated by the reference index of the candidate block is different from the reference image of the current block, and at least one of the reference image of the current block and the reference image of the candidate block is the long-term reference image, a process of scaling the size of the motion vector of the candidate block may be skipped or a process of referring to the motion vector of the candidate block may be skipped.

That is, when the reference image of the current block is different from the reference image of the candidate block, and at least one of the reference image of the current block and the reference image of the candidate block is the long-term reference image, if the motion vector of the current block is predicted by referring to the motion vector of the candidate block, an accuracy of the predicted motion vector may deteriorate, and therefore, a process of referring to the motion vector of the candidate block, which lacks a prediction accuracy, may be skipped and the current block may be predicted by referring to a motion vector of another candidate block having a relatively high accuracy. By doing so, an efficiency of a motion vector prediction process may be improved.

Hereinafter, referring to FIGS. 3 and 4, a motion vector predicting method according to types of a candidate block is described in detail.

Figure 3:
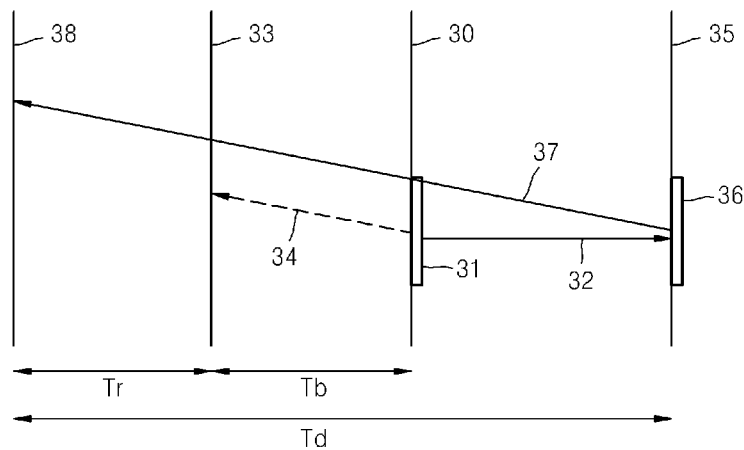
FIG. 3 illustrates an example in which a candidate block is a collocated block of another image, according to an embodiment of the present invention.

FIG. 3 illustrates an example in which the candidate block is a collocated block of another image, according to an embodiment of the present invention.

A collocated image 35 is restored earlier than a current image 30 and may be referred for inter prediction of a current block 31 in the current image 30. The collocated image 35 may be determined according to a collocated index 32 of the current block 31.

In the collocated image 35, a block that is at the same position as the current block 31 of the current image 30 may be determined as a collocated block 36. The motion vector determining apparatus 10 may use the collocated block 36 as a candidate block, i.e., a reference target used to predict a motion vector 34 of the current block 31. Thus, the motion vector 34 of the current block 31 may be predicted by referring to a motion vector 37 of the collocated block 36.

A collocated reference image 38 may be determined according to a POC indicated by a reference index of the collocated block 36. A current reference image 33 may be determined according to a POC indicated by a reference index of the current block 31.

However, when the collocated reference image 38 is different from the current reference image 33, the motion vector determining apparatus 10 may re-determine whether or not to refer to the motion vector 37 of the collocated block 36 or how to refer to the motion vector 37 of the collocated block 36.

In more detail, when the reference index of the collocated block 36 is different from the reference index of the current block 31, the motion vector determining apparatus 10 may check whether the collocated reference image 38 and the current reference image 33 are short-term reference images or long-term reference images, by using a long-term reference index of the collocated block 36 and a long-term reference index of the current block 31.

When the collocated reference image 38 is different from the current reference image 33, the motion vector determining apparatus 10 may re-determine whether or not to refer to the motion vector 37 of the collocated block 36 or how to refer to the motion vector 37 of the collocated block 36.

According to a result of the check, when the collocated reference image 38 is different from the current reference image 33 but all of the current reference image 33 and the collocated reference image 38 are short-term reference images, a size of the motion vector 37 of the collocated block 36 may be scaled based on a ratio of a distance Td between the collocated image 35 and the collocated reference image 38 to a distance Tb between the current image 30 and the current reference image 33. Here, a distance Td between the collocated image 35 and the collocated reference image 38 may be determined according to a value of a difference between POCs of the collocated image 35 and the collocated reference image 38. Similarly, the distance Tb between the current image 30 and the current reference image 33 may be determined according to a value of a difference between POCs of the current image 30 and the current reference image 33.

That is, when all of the current reference image 33 and the collocated reference image 38 are the short-term reference images, a candidate motion vector MVcol' may be updated by a value obtained by multiplying the motion vector 37 (MVcol) of the collocated block 36 by the ratio of the distance Td between the collocated image 35 and the collocated reference image 38 to the distance Tb between the current image 30 and the current reference image 33 (MVcol'=MVcol*Tb/Td).

Thus, according to the result of the check, when the collocated reference image 38 is different from the current reference image 33 but all of the current reference image 33 and the collocated reference image 38 are the short-term reference images, the motion vector determining apparatus 10 may change the motion vector 37 of the collocated block 36 as the value MVcol' in the candidate motion vector list, wherein the value MVcol' is obtained by multiplying the motion vector 37 of the collocated block 36 by the ratio (Tb/Td) of the distance Td between the collocated image 35 and the collocated reference image 38 to the distance Tb between the current image 30 and the current reference image 33.

When one of the current reference image 33 and the collocated reference image 38 is a short-term reference image, and the other one of the current reference image 33 and the collocated reference image 38 is a long-term reference image, a 'NOT-AVAILABLE' flag may be allocated to the motion vector 37 of the collocated block 36. In this case, the motion vector 37 of the collocated block 36 may be excluded from the candidate motion vector list.

When all of the current reference image 33 and the collocated reference image 38 are long-term reference images, the motion vector 37 of the collocated block 36 may be maintained. In this case, the motion vector 37 of the collocated block 36 may be maintained in the candidate motion vector list while a size of the motion vector 37 is not scaled.

Figure 4:
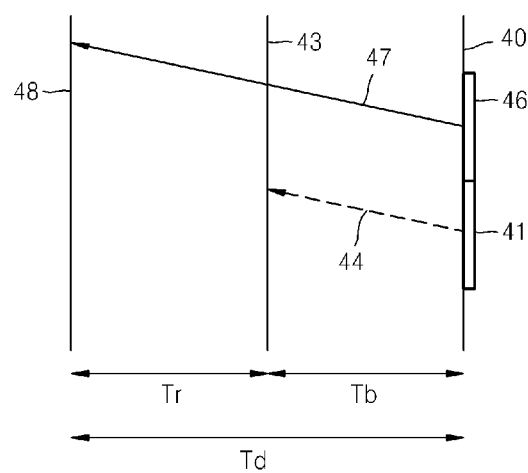
FIG. 4 illustrates an example in which the candidate block is a neighboring block of the same image, according to an embodiment of the present invention.

FIG. 4 illustrates an example in which the candidate block is a neighboring block 46 of the same image, according to an embodiment of the present invention.

The motion vector determining apparatus 10 may use the neighboring block 46 as a candidate block that is a reference target used in prediction of a motion vector 44 of a current block 41, wherein the neighboring block 46 is adjacent to the current block 41. Thus, the motion vector 44 of the current block 41 may be predicted by referring to a motion vector 47 of the neighboring block 46.

A neighboring reference image 48 may be determined according to a POC indicated by a reference index of the neighboring block 46. A current reference image 43 may be determined according to a POC indicated by a reference index of the current block 41.

However, when the neighboring reference image 48 is different from the current reference image 43, the motion vector determining apparatus 10 may re-determine whether to refer to the motion vector 47 of the neighboring block 46 or how to refer to the motion vector 47 of the neighboring block 46.

In more detail, when the reference index of the neighboring block 46 is different from the reference index of the current block 41, the motion vector determining apparatus 10 may check whether the neighboring block 46 and the current reference image 43 are short-term reference images or long-term reference images, by using the long-term reference index of the neighboring block 46 and the long-term reference index of the current block 41.

When the neighboring reference image 48 is different from the current reference image 43, the motion vector determining apparatus 10 may re-determine whether to refer to the motion vector 47 of the neighboring block 46 or how to refer to the motion vector 47 of the neighboring block 46.

According to a result of the check, when the current reference image 43 is different from the neighboring reference image 48 but all of the current reference image 43 and the neighboring reference image 48 are short-term reference images, a size of the motion vector 47 of the neighboring block 46 may be scaled based on a ratio of a distance Td between a current image 40 and the neighboring reference image 48 to a distance Tb between the current image 40 and the current reference image 43. The distance Td between the current image 40 and the neighboring reference image 48 may be determined as a value of a difference between POCs of the current image 40 and the neighboring reference image 48. Similarly, the distance Tb between the current image 40 and the current reference image 43 may be determined as a value of a difference between POCs of the current image 40 and the current reference image 43.

That is, when all of the current reference image 43 and the neighboring reference image 48 are the short-term reference images, a candidate motion vector MVne' may be updated as as value obtained by multiplying the motion vector 47 (MVne) of the neighboring block 46 by the ratio (Tb/Td) of the distance Td between the current image 40 and the neighboring reference image 48 to the distance Tb between the current image 40 and the current reference image 43 (MVne'=MVne*Tb/Td).

Thus, according to the result of the check, when the current reference image 43 and the neighboring reference image 48 are different from each other but all of them are the short-term reference images, the motion vector determining apparatus 10 may change the motion vector 47 of the neighboring block 46 as the value MVne' in the candidate motion vector list, wherein the value MVne' is obtained by multiplying the motion vector 47 (MVne) of the neighboring block 46 by the ratio (Tb/Td) of the distance Td between the neighboring reference image 48 and the current image 40 to the distance Tb between the current image 40 and the current reference image 43

When one of the current reference image 43 and the neighboring reference image 48 is a short-term reference image and the other one is a long-term reference image, a 'NON-USABLE' flag may be allocated to the motion vector 47 of the neighboring block 46. In this case, the motion vector 47 of the neighboring block 46 may be excluded from the candidate motion vector list of the current image 40.

When all of the current reference image 43 and the neighboring reference image 48 are long-term reference images, the motion vector 47 of the neighboring block 46 may be maintained. In this case, the motion vector 47 of the neighboring block 46 may be maintained in the candidate motion vector list while a size of the motion vector 47 is not scaled.

In the embodiments of FIGS. 3 and 4, the motion vector determining apparatus 10 may determine whether each of a current reference image (i.e., the current reference images 33 and 43) and a reference image (i.e., the collocated reference image 38 and the neighboring reference image 48) of a candidate block (i.e., the collocated block 36 and the neighboring block 46) is the short-term reference image or the long-term reference image, by using long-term reference indexes of a current block (i.e., the current blocks 31 and 41) and the candidate block, and according to a result of the determination, the motion vector determining apparatus 10 may determine whether or not to refer to a motion vector (i.e., the motion vectors 37 and 47) of the candidate block or whether to refer to the motion vector after scaling a size of the motion vector.

In another embodiment, the motion vector determining apparatus 10 may determine whether or not to refer to the motion vector of the candidate block or whether to refer to the motion vector after scaling the size of the motion vector, by using reference indexes indicating POCs of the current reference image and the reference image of the candidate block, instead of using the long-term reference indexes of the current block and the candidate block.

In more detail, the motion vector determining apparatus 10 according to another embodiment with reference to FIG. 3 may compare a difference Tr between the reference index of the collocated block 36 and the reference index of the current block 31 with a first threshold value THpocdiff1, and when the difference Tr between the reference indexes is greater than the first threshold value THpocdiff1, the motion vector determining apparatus 10 may determine that the motion vector 37 of the collocated block 36 is not a reference target or may determine to refer to the motion vector 37 without scaling a size of the motion vector 37.

Similarly, the motion vector determining apparatus 10 according to another embodiment with reference to FIG. 4 may compare a difference Tr between the reference index of the neighboring block 46 and the reference index of the current block 41 with a first threshold value THpocdiff1, and when the difference Tr between the reference indexes is greater than the first threshold value THpocdiff1, the motion vector determining apparatus 10 may determine that the motion vector 47 of the neighboring block 46 is not a reference target or may determine to refer to the motion vector 47 without scaling a size of the motion vector 47.

In the other embodiments of FIGS. 3 and 4, when the difference Tr between the reference index of the candidate block (i.e., the candidate blocks 36 and 46) and the reference index of the current block 31 is greater than the first threshold value THpocdiff1, the motion vector determining apparatus 10 may determine that at least one of the candidate reference image (i.e., the collocated reference image 38 and the neighboring reference image 48), which is indicated by the reference index of the candidate block (36 and 46), and the current reference image (33 and 43), which is indicated by the reference index of the current block 31, is the long-term reference image.

Thus, when the difference Tr between the reference index of the candidate block (36 and 46) and the reference index of the current block 31 is greater than the first threshold value THpocdiff1, the motion vector determining apparatus 10 may not need to scale the size of the motion vector (37 and 47) of the candidate block (36 and 46) by using a image distance ratio (Tb/Td) but may determine that the candidate block (36 and 46) is not a reference target and thus may exclude the motion vector (37 and 47) of the candidate block (36 and 46) from the candidate motion vector list. Alternatively, the motion vector determining apparatus 10 may determine to predict the motion vector (34 and 44) of the current block (31 and 41) by referring to the motion vector (37 and 47) of the candidate block (36 and 46) while the size of the motion vector (37 and 47) of the candidate block (36 and 46) is not scaled.

In another embodiment, the motion vector determining apparatus 10 may compare a value of a difference between POCs of the current image (30 and 40) and the current reference image (33 and 43) with a second threshold value THpocdiff2 and according to a result of the comparison, the motion vector determining apparatus 10 may determine whether or not to refer to the motion vector (37 and 47) of the candidate block (36 and 46) or whether to refer to the scaled motion vector after scaling the size of the motion vector (37 and 47).

Thus, when a difference Tb between the POCs of the current reference image (33 and 43), which is indicated by the reference index of the current block (31 and 41), and the current image (30 and 40) is greater than the second threshold value THpocdiff2, the motion vector determining apparatus 10 may not need to scale the size of the motion vector (37 and 47) of the candidate block (36 and 46) by using the image distance ratio (Tb/Td) but may determine that the candidate block (36 and 46) is not a reference target and thus may exclude the motion vector (37 and 47) of the candidate block (36 and 46) from the candidate motion vector list. Alternatively, the motion vector determining apparatus 10 may determine to predict the motion vector (34 and 44) of the current block (31 and 41) by referring to the motion vector (37 and 47) of the candidate block (36 and 46) while the size of the motion vector (37 and 47) of the candidate block (36 and 46) is not scaled.

The first threshold value THpocdiff1 or the second threshold value THpocdiff2 may be set as one of values below. i) number of reference images; ii) double number of the number of reference images; iii) total sum of a size of group of pictures (GOP) and the double number of the number of reference images; iv) total sum of maximally-allowed number max_num_reorder_pics of images that precede a current image in a decoding order and that are consecutive in an output order and the double number of the number of reference images; v) total sum of a maximum delay time max_output_delay by which an output of a restored image that is stored in a DPB is maximally delayed and the double number of the number of reference images; vi) double number of the size of the GOP; vii) double number of the maximally-allowed number max_num_reorder_pics of images that precede the current image in the decoding order and that are consecutive in the output order; and viii) double number of the maximum delay time max_output_delay by which the output of the restored image that is stored in the DPB is maximally delayed.

When a candidate block is the collocated block 36, the first threshold value THpocdiff1 or the second threshold value THpocdiff2 may vary according to relative positions of the current image 30, the current reference image 33, and the collocated reference image 38. For example, there may be two cases of i) when all of the reference index of the collocated block 36 and the reference index of the current block 31 are greater or less than the POC of the current image 30 (first case), and ii) when the POC of the current image 30 is between the reference index of the collocated block 36 and the reference index of the current block 31 (second case). The first threshold value THpocdiff1 or the second threshold value THpocdiff2 may differ in the first and second cases.

Also, the first threshold value THpocdiff1 or the second threshold value THpocdiff2 may vary based on a temporal depth of a hierarchical structure according to temporal prediction of the current image 30. For example, when a plurality of images are hierarchically referred for the temporal prediction of the current image 30, the first threshold value THpocdiff1 or the second threshold value THpocdiff2 may be adjusted according to how many hierarchies are referred in the hierarchical structure.

Alternatively, the first threshold value THpocdiff1 or the second threshold value THpocdiff2 may vary according to a position of the current image 30 in a GOP structure including the current image 30.

Alternatively, the first threshold value THpocdiff1 or the second threshold value THpocdiff2 may vary according to a POC of the current image 30 in the GOP structure including the current image 30.

The first threshold value THpocdiff1 or the second threshold value THpocdiff2 of the current image 30, which is used in video encoding, may be encoded and transferred to a video decoder. For example, the first threshold value THpocdiff1 or the second threshold value THpocdiff2 may be determined for each sequence, each picture, or each slice, or may be adaptively determined according to pictures. Accordingly, a sequence parameter set (SPS), a picture parameter set (PPS), a slice header, and an adaptation parameter set (APS) may contain information about the first threshold value THpocdiff1 or the second threshold value THpocdiff2.

In another embodiment, a video encoder and the video decoder may not transmit and receive the first threshold value THpocdiff1 or the second threshold value THpocdiff2 of the current image 30 but may predict the first threshold value THpocdiff1 or the second threshold value THpocdiff2. For example, the first threshold value THpocdiff1 or the second threshold value THpocdiff2 may be predicted based on a random access or a low delay which is the hierarchical structure of the temporal prediction of the current image 30. Alternatively, the first threshold value THpocdiff1 or the second threshold value THpocdiff2 may be predicted based on the POC of the current image 30.

Hereinafter, referring to FIGS. 5 and 6, video encoding and decoding methods including the motion vector determining method are described in detail.

Figure 5:
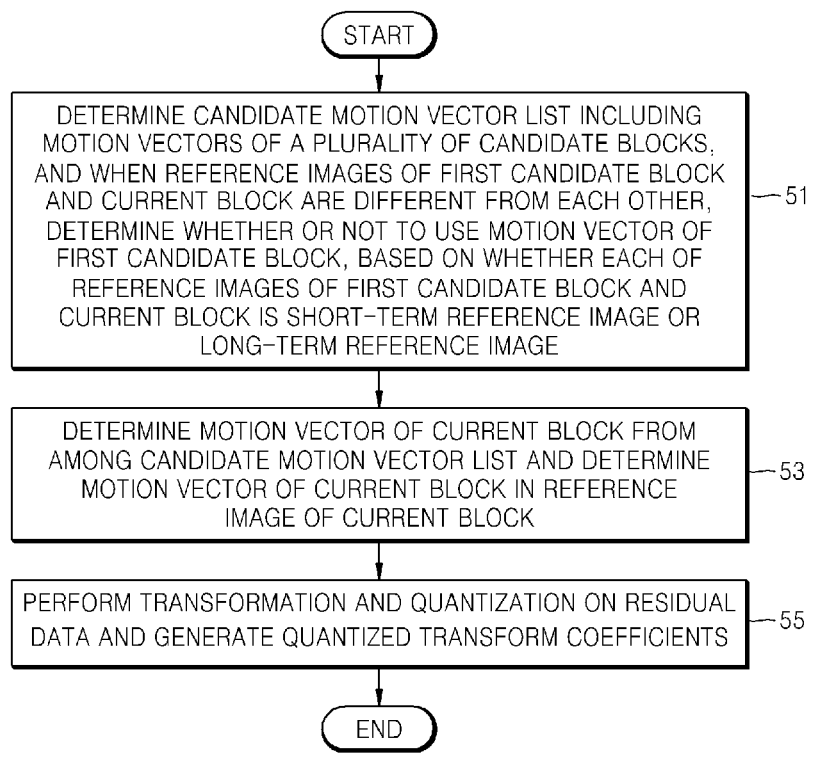
FIG. 5 is a flowchart of a video encoding method including the motion vector determining method, according to an embodiment of the present invention.

FIG. 5 is a flowchart of a video encoding method including the motion vector determining method, according to an embodiment of the present invention.

In operation 51, according to the motion vector determining method, a candidate motion vector list including motion vectors of a plurality of candidate blocks that are referred so as to predict a motion vector of a current block may be determined.

When a reference image of a first candidate block from among the candidate blocks is different from a reference image of the current block, the video encoding method may determine whether to use a motion vector of the first candidate block in the candidate motion vector list based on whether each of the reference image of the current block and the reference image of the first candidate block is a short-term reference image or a long-term reference image.

When all of the reference image of the current block and the reference image of the first candidate block are the long-term reference images, the motion vector of the first candidate block may be included in the candidate motion vector list while a size of the motion vector of the first candidate block is not scaled.

When one of the reference image of the current block and the reference image of the first candidate block is the short-term reference image and the other one of them is the long-term reference image, the video encoding method may determine not to use the motion vector of the first candidate block in the candidate motion vector list.

When all of the reference image of the current block and the reference image of the first candidate block are the short-term reference images, the motion vector of the first candidate block may be included in the candidate motion vector list after the size of the motion vector of the first candidate block is scaled.

In operation 53, a candidate motion vector that is determined in operation 51 and that is from among the motion vectors included in the candidate motion vector list may be selected as a reference motion vector, and a motion vector of the current block may be determined by referring to the selected reference motion vector. The motion vector of the current block may be determined by duplicating the reference motion vector without a change or by modifying the reference motion vector. For example, when there is difference information about the motion vector, the reference motion vector and the difference information may be synthesized so that the motion vector of the current block may be determined.

When a reference block that is indicated by the motion vector of the current block which is determined in the reference image of the current block is determined, residual data between the reference block and the current block may be generated.

In operation 55, transformation and quantization may be performed on the residual data that is generated in operation 53, so that quantized transform coefficients may be generated.

Inter prediction of operations 51, 53, and 55, the transformation, and the quantization may be performed on each block of the current image, so that the quantized transform coefficients may be generated in each block. Also, entropy encoding may be performed on the quantized transform coefficients for each block, so that a bitstream may be generated and output.

The video encoding method according to the embodiment of FIG. 5 may be implemented by a video encoding apparatus. A video encoding processor for implementation of the video encoding method according to the embodiment of FIG. 5 may be mounted in the video encoding apparatus or may drive in connection with an external video encoding apparatus, so that the video encoding apparatus may perform video encoding operations including the inter prediction, the transformation, and the quantization. According to an embodiment according to the present invention, an internal video encoding processor of the video encoding apparatus may be embodied by adding a video encoding processing module to a video encoding device, a central operating device, or a graphic operating device as well as to a separate processor, which performs a basic video encoding operation.

Figure 6:
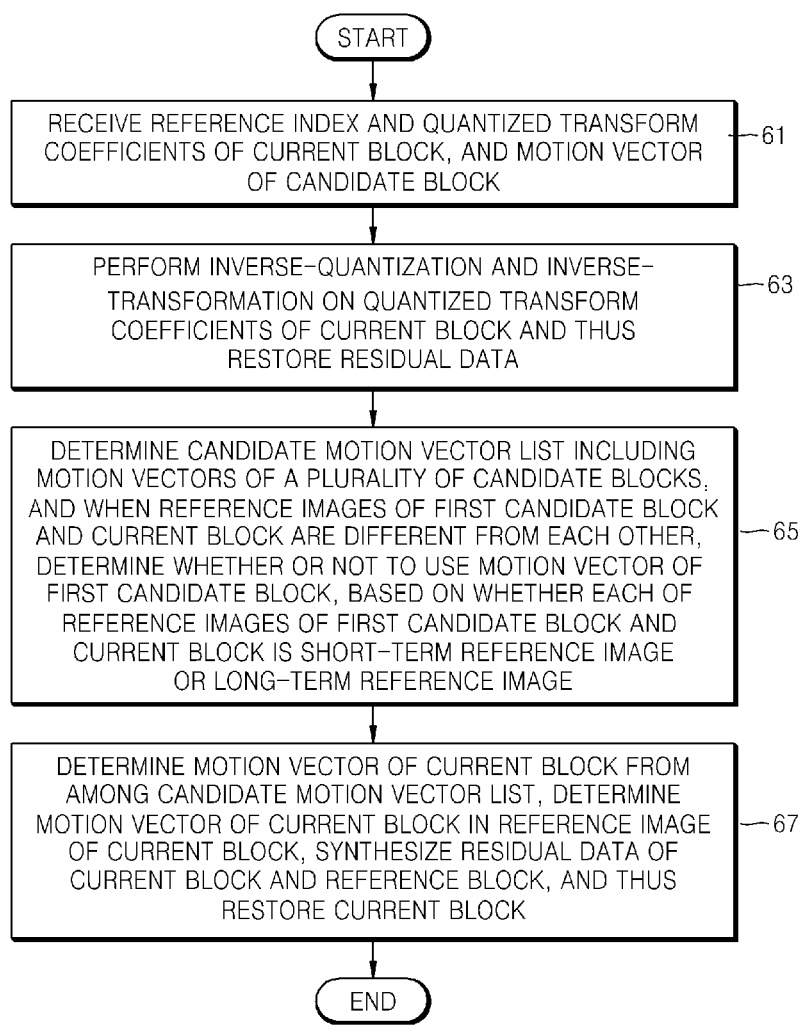
FIG. 6 is a flowchart of a video decoding method including the motion vector determining method, according to an embodiment of the present invention.

FIG. 6 is a flowchart of a video decoding method including the motion vector determining method, according to an embodiment of the present invention.

In operation 61, a reference index and quantized transform coefficients of a current block, and a motion vector of a candidate block may be received.

In operation 63, inverse-quantization and inverse-transformation may be performed on the quantized transform coefficients of the current block which are received in operation 61, so that residual data of the current block may be restored.

In operation 65, a candidate motion vector list for the current block may be determined. When a reference image of a first candidate block from among a plurality of candidate blocks is different from a reference image of the current block, the video decoding method may determine whether to use a motion vector of the first candidate block in the candidate motion vector list based on whether each of the reference image of the current block and the reference image of the first candidate block is a short-term reference image or a long-term reference image.

When all of the reference image of the current block and the reference image of the first candidate block are the long-term reference images, the motion vector of the first candidate block may be included in the candidate motion vector list while a size of the motion vector of the first candidate block is not scaled.

When one of the reference image of the current block and the reference image of the first candidate block is the short-term reference image and the other one of them is the long-term reference image, the video decoding method may determine not to use the motion vector of the first candidate block in the candidate motion vector list.

When all of the reference image of the current block and the reference image of the first candidate block are the short-term reference images, the motion vector of the first candidate block may be included in the candidate motion vector list after the size of the motion vector of the first candidate block is scaled.

In operation 67, a candidate motion vector that is determined in operation 65 and that is from among the motion vectors included in the candidate motion vector list may be selected as a reference motion vector, and a motion vector of the current block may be determined by referring to the selected reference motion vector. For example, when difference information about the motion vector is received, the reference motion vector and the difference information may be synthesized so that the motion vector of the current block may be determined.

A reference block that is indicated by the motion vector of the current block in the reference image of the current block which is indicated by a reference index of the current block may be determined. By synthesizing the determined reference block and residual data of the current block, the current block may be restored.

Operations 61, 63, 65, and 67 may be performed for each of blocks, so that the current image including the restored blocks may be restored. As images are restored, a video including a sequence of the restored images may be restored.

A video decoding procedure including operations 61, 63, 65, and 67 may be performed when the video is restored by receiving an encoded video stream and then decoding the video stream. In this case, in operation 61, the received video stream may be parsed and thus quantized transform coefficients of the reference index of the current block, and the motion vector of the candidate block may be extracted from the video stream.

The video decoding procedure including operations 61, 63, 65, and 67 may also be performed to generate a restored image to be referred for inter prediction of another image in the aforementioned video encoding method. In this case, in operation 61, the reference index and the quantized transform coefficients of the current block, which are generated via the inter prediction, the transformation, and the quantization, and the motion vector of the candidate block may be received, and then operations 63, 65, and 67 may be stepwise performed, so that a finally-restored current image may be used as a reference image for inter prediction of another image.

The video decoding method according to the embodiment of FIG. 6 may be implemented by a video decoding apparatus. A video decoding processor for implementation of the video decoding method according to the embodiment of FIG. 6 may be mounted in the video decoding apparatus or may drive in connection with an external video decoding apparatus, so that the video decoding apparatus may perform video decoding operations including the inverse quantization, the inverse transformation, and the intra prediction, and the motion compensation. According to an embodiment according to the present invention, an internal video decoding processor of the video decoding apparatus may be embodied by adding a video decoding processing module to a video decoding device, a central operating device, or a graphic operating device as well as to a separate processor, which performs a basic video decoding operation.

Figure 7:
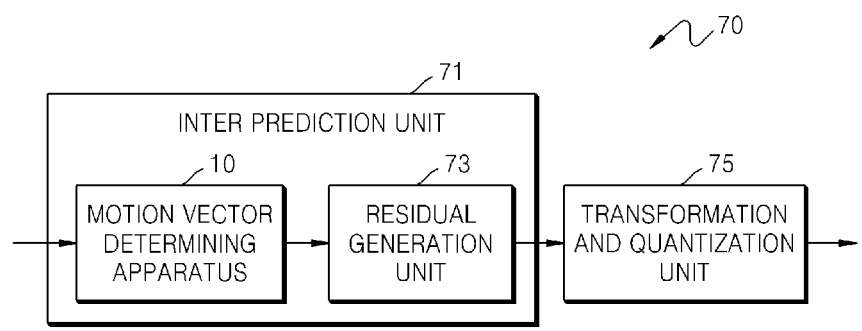
FIG. 7 is a block diagram of a video encoding unit including the motion vector determining apparatus, according to an embodiment of the present invention.

FIG. 7 is a block diagram of a video encoding unit 70 including the motion vector determining apparatus 10, according to an embodiment of the present invention.

The video encoding unit 70 includes an inter prediction unit 71 and a transformation and quantization unit 75. The inter prediction unit 71 may include the motion vector determining apparatus 10 and a residual generation unit 73.

The motion vector determining apparatus 10 determines a motion vector for each block. Also, for motion vector prediction, PU merging, or AMVP, a motion vector of a current block may be predicted by referring to a motion vector of another block. The motion vector determining apparatus 10 may determine a candidate motion vector list of the current block so as to perform motion vector prediction. A reference motion vector may be decided from among candidate motion vectors included in the candidate motion vector list.

The motion vector determining apparatus 10 may determine the reference motion vector by selecting an optimal candidate motion vector from among the motion vectors included in the candidate motion vector list and may determine the motion vector of the current block by using the selected reference motion vector.

The residual generation unit 73 may determine a reference block that is indicated by the motion vector of the current block in the reference image of the current block and may generate residual data between the reference block and the current block.

Accordingly, the inter prediction unit 71 may perform inter prediction for each block and then may output the residual data for each block.

The transformation and quantization unit 75 may perform transformation and quantization on the residual data that is output from the inter prediction unit 71 and thus may generate quantized transform coefficients. The transformation and quantization unit 75 may perform the transformation and the quantization on the residual data for each block which is received from the inter prediction unit 71 and thus may generate the quantized transform coefficients for each block.

The video encoding unit 70 may perform entropy encoding on the quantized transform coefficients which are generated by the transformation and quantization unit 75 and thus may output an encoded bitstream. Also, when the reference index, the motion vector, a long-term reference index, or the like are output from the inter prediction unit 71, the video encoding unit 70 may perform the entropy encoding not only on the quantized transform coefficients but also on the reference index, the motion vector, and the long-term reference index and thus may output a bitstream.

Figure 8:
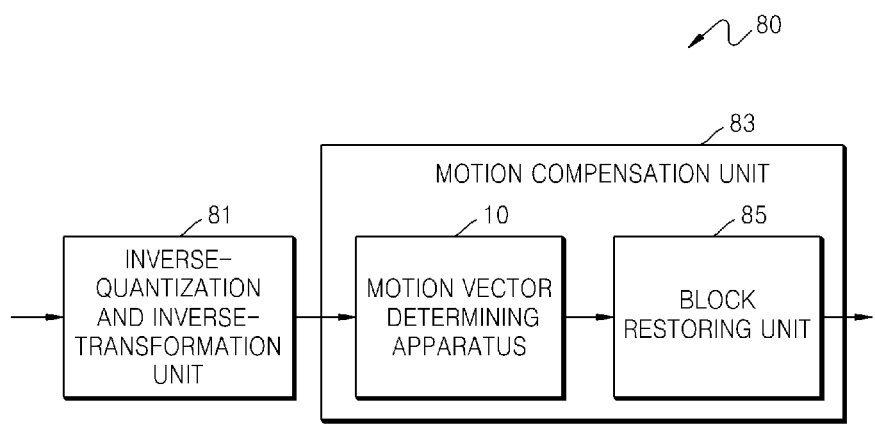
FIG. 8 is a block diagram of a video decoding unit including the motion vector determining apparatus, according to an embodiment of the present invention.

FIG. 8 is a block diagram of a video decoding unit 80 including the motion vector determining apparatus 10, according to an embodiment of the present invention.

The video decoding unit 80 includes an inverse-quantization and inverse-transformation unit 81 and a motion compensation unit 83. The motion compensation unit 83 may include the motion vector determining apparatus 10 and a block restoring unit 85.

The video decoding unit 80 may receive a reference index and quantized transform coefficients of a current block, and a motion vector of a candidate block. The inverse-quantization and inverse-transformation unit 81 may perform inverse quantization and inverse transformation on the quantized transform coefficients of the current block and thus may restore residual data of the current block.

The motion compensation unit 83 may perform motion compensation on the current block that is encoded via inter prediction and thus may restore the current block.

The motion vector determining apparatus 10 determines a motion vector for each block. The motion vector determining apparatus 10 may determine a candidate motion vector list of the current block so as to predict the motion vector. A candidate block may include a collocated block or a neighboring block. The motion vector determining apparatus 10 may determine a reference motion vector from among candidate motion vectors included in the candidate motion vector list.

When a reference image of a first candidate block from among the candidate blocks included in the candidate motion vector list of the current block is different from the reference image of the current block, the motion vector determining apparatus 10 may determine whether or not to use the reference image of the first candidate block in the candidate motion vector list, based on whether each of the reference image of the current block and the reference image of the first candidate block is a short-term reference image or a long-term reference image.

The motion vector determining apparatus 10 may determine the reference motion vector by selecting an optimal candidate motion vector from among the candidate motion vectors included in the candidate motion vector list, may predict a motion vector of the current block by using the reference motion vector, and then may determine the motion vector of the current block.

The block restoring unit 85 may determine the reference image of the current block which is indicated by a reference index of the current block which is received by the video decoding unit 80. A reference block that the motion vector of the current block, which is determined in the motion vector determining apparatus 10, indicates in the reference image may be determined, the reference block and residual data of the current block may be synthesized, and thus the current block may be restored.

The motion compensation unit 83 may perform motion compensation for each block, may restore each block, and thus may restore the current image including restored blocks. In this manner, the video decoding unit 80 may restore images and thus may restore a video including an image sequence.

The video decoding unit 80 may further include an in-loop filtering unit (not shown) that performs deblocking filtering on the restored image including the current block and blocks which are restored as the blocks are restored.

The video decoding unit 80 may receive an encoded video stream, may decode the video stream, and thus may restore the video. In this case, the video decoding unit 80 may parse the video stream and thus may extract the reference index and the quantized transform coefficients of the current block, and the motion vector of the candidate block from the video stream. Also, the video decoding unit 80 may further include a receiving unit (not shown) that receives a bitstream, that performs entropy decoding on the bitstream, and that parses and extracts the reference index and the quantized transform coefficients of the current block, and the motion vector of the candidate block from the bitstream.

In order to generate a restored image to be referred for inter prediction of another image by the video encoding unit 70 that is described above with reference to FIG. 7, the video decoding unit 80 may be combined with the video encoding unit 70. In this case, the video decoding unit 80 may receive the reference index and the quantized transform coefficients of the current block, which are generated via the inter prediction, the transformation, and the quantization and then are output from the video encoding unit 70, may receive the motion vector of the candidate block, and may output the current image that is finally restored by the inverse-quantization and inverse-transformation unit 81 and the motion compensation unit 83. The restored image that is output from the video decoding unit 80 may be used as a reference image for inter prediction of another image by the video encoding unit 70.

As described above, in the motion vector determining apparatus 10, blocks obtained by splitting video data is split into coding units according to a tree structure, and prediction coding units are used for inter prediction for a coding unit. Hereinafter, with reference to FIGS. 9 through 22, a method and apparatus for encoding a video and a method and apparatus for decoding a video, based on a coding unit and a transformation unit according to a tree structure will be described.

Figure 9:
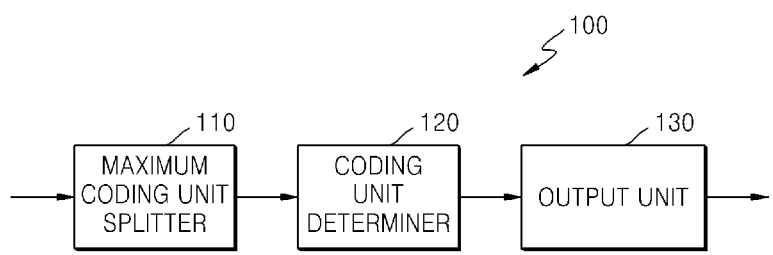
FIG. 9 is a block diagram of a video encoding apparatus based on a coding unit according to a tree structure, according to an embodiment according to the present invention.

FIG. 9 is a block diagram of a video encoding apparatus 100 based on a coding unit according to a tree structure, according to an embodiment according to the present invention.

The video encoding apparatus 100 via video prediction based on a coding unit according to a tree structure includes a maximum coding unit splitting unit 110, a coding unit determiner 120 and an output unit 130. Hereinafter, for convenience of description, the video encoding apparatus 100 via video prediction based on a coding unit according to a tree structure is referred to as 'the video encoding apparatus 100'.

The maximum coding unit splitting unit 110 may split a current picture based on a maximum coding unit for the current picture of an image. If the current picture is larger than the maximum coding unit, image data of the current picture may be split into the at least one maximum coding unit. The maximum coding unit according to an embodiment according to the present invention may be a data unit having a size of 32×32, 64×64, 128×128, 256×256, etc., wherein a shape of the data unit is a square having a width and length in squares of 2. The image data may be output to the coding unit determiner 120 by at least one maximum coding unit.

A coding unit according to an embodiment according to the present invention may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an embodiment according to the present invention is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth is finally output. Also, the coding units corresponding to the coded depth may be regarded as encoded coding units. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split into regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an embodiment according to the present invention include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an embodiment according to the present invention is an index related to the number of times splitting is performed from a maximum coding unit to a minimum coding unit. A first maximum depth according to an embodiment according to the present invention may denote the total number of times splitting is performed from the maximum coding unit to the minimum coding unit. A second maximum depth according to an embodiment according to the present invention may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to a method of orthogonal transformation or integer transformation.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding on the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. The partition is a data unit obtained by dividing the prediction unit of the coding unit and the prediction unit may be a partition having the same size as the coding unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a transformation unit that is different from the coding unit. In order to perform the transformation in the coding unit, the transformation may be performed based on a data unit having a size smaller than or equal to the coding unit. For example, the transformation unit for the transformation may include a transformation unit for an intra mode and a data unit for an inter mode.

Similarly to the coding unit according to the tree structure according to the present embodiment, the transformation unit in the coding unit may be recursively split into smaller sized regions and residual data in the coding unit may be divided according to the transformation having the tree structure according to transformation depths.

According to an embodiment according to the present invention, a transformation depth indicating the number of times splitting is performed to reach the transformation unit by splitting the height and width of the coding unit may also be set in the transformation unit. For example, when the size of a transformation unit of a current coding unit is 2N×2N, a transformation depth may be set to 0. When the size of a transformation unit is N×N, the transformation depth may be set to 1. In addition, when the size of the transformation unit is N/2×N/2, the transformation depth may be set to 2. That is, the transformation unit according to the tree structure may also be set according to the transformation depth.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units and a prediction unit/partition according to a tree structure in a maximum coding unit, and a method of determining a transformation unit, according to embodiments according to the present invention, will be described in detail later with reference to FIGS. 11 through 22.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to the coded depth may include information about the coded depth, the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an embodiment according to the present invention is a rectangular data unit obtained by splitting the minimum coding unit constituting the lowermost depth by 4. Alternatively, the minimum unit may be a maximum rectangular data unit having a maximum size, which is included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Also, information about a maximum size of the coding unit defined according to pictures, slices, or GOPs, and information about a maximum depth may be inserted into a header of a bitstream, a SPS (Sequence Parameter Set) or a picture parameter set (PPS).

In addition, information about a maximum size of a transformation unit and information about a minimum size of a transformation, which are acceptable for a current video may also be output via a header of a bitstream, a SPS or a PPS. The output unit 130 may encode and output reference information, prediction information, single-direction prediction information, and information about a slice type including a fourth slice type, which are related to prediction described with reference to FIGS. 1 through 8.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum value 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The video encoding apparatus 100 of FIG. 9 may perform operations by the motion vector determining apparatus 10 and the video encoding unit 70 which are described above with reference to FIG. 1.

The coding unit determiner 120 may determine a prediction unit including a partition for inter prediction for each respective coding unit according to a tree structure for each maximum coding unit and may perform inter prediction for each respective prediction unit.

The coding unit determiner 120 determines a motion vector for each respective prediction unit. Also, for motion vector prediction, PU merging, or AMVP, a motion vector of a current prediction unit (partition) may be predicted by referring to a motion vector of another prediction unit. The coding unit determiner 120 may determine a candidate motion vector list of the current prediction unit so as to perform the motion vector prediction. A reference motion vector may be decided from among candidate motion vectors included in the candidate motion vector list. The first candidate prediction unit may be a neighboring prediction unit that is adjacent to the current prediction unit in a current image or may be a collocated prediction unit in a collocated image.

When a reference image of a first candidate prediction unit from among the candidate prediction units in the candidate motion vector list of the current prediction unit is different from the reference image of the current prediction unit, the coding unit determiner 120 determines whether or not to use a motion vector of the first candidate prediction unit from the candidate motion vector list, based on whether each of the reference image of the current prediction unit and the reference image of the first candidate prediction unit is a short-term reference image or a long-term reference image.

Alternatively, it is possible to determine whether each of the reference image of the current prediction unit and the reference image of the first candidate prediction unit is a short-term reference image or a long-term reference image, based on long-term reference indexes of the current prediction unit and the first candidate prediction unit.

When all of the reference image of the current prediction unit and the reference image of the first candidate prediction unit are the long-term reference images, it is possible to maintain the motion vector of the first candidate prediction unit in the candidate motion vector list without scaling a size of the motion vector of the first candidate prediction unit.

When one of the reference image of the current prediction unit and the reference image of the first candidate block is the short-term reference image, and the other one of the reference image of the current prediction unit and the reference image of the first candidate block is the long-term reference image, it is possible to determine not to use the motion vector of the first candidate prediction unit in the candidate motion vector list.

When all of the reference image of the current prediction unit and the reference image of the first candidate prediction unit are the short-term reference images, it is possible to scale the size of the motion vector of the first candidate prediction unit and then to include the motion vector of the first candidate prediction unit in the candidate motion vector list.

The coding unit determiner 120 may determine a reference motion vector by selecting an optimal reference motion vector from among motion vectors included in the candidate motion vector list and may predict and determine the motion vector of the current prediction unit by using the selected reference motion vector.

The coding unit determiner 120 may determine the reference image of the current prediction unit according to a POC indicated by the reference index of the current prediction unit. Regardless of whether the reference image of the current prediction unit is the short-term reference image or the long-term reference image, the reference index may indicate the POC and the coding unit determiner 120 may determine an image, which is indicated by the POC, as the reference image.

The coding unit determiner 120 may determine a reference block that is indicated by the motion vector of the current prediction unit in the reference image of the current prediction unit and may generate residual data between the reference prediction unit and the current prediction unit.

Accordingly, the coding unit determiner 120 may perform inter prediction for each prediction unit and then may output the residual data for each prediction unit.

The coding unit determiner 120 may perform transformation and quantization on transformation units of a coding unit including the residual data for each prediction unit and thus may generate quantized transform coefficients. Accordingly, the coding unit determiner 120 may generate the quantized transform coefficients for each transformation unit.

Also, the coding unit determiner 120 may perform operations of the video decoding unit 80 described above with reference to FIG. 8, in order to generate a reference image used in inter prediction of a prediction unit.

The coding unit determiner 120 may perform inverse-quantization and inverse-transformation on the quantized transform coefficients of the current prediction unit, and thus may restore the residual data of the current block.

The coding unit determiner 120 may determine the candidate motion vector list of the current prediction unit, and when the reference image of the first candidate prediction unit from among the candidate prediction units in the candidate motion vector list of the current prediction unit is different from the reference image of the current prediction unit, the coding unit determiner 120 may determine whether or not to use a motion vector of the first candidate prediction unit from the candidate motion vector list, based on whether each of the reference image of the current prediction unit and the reference image of the first candidate prediction unit is the short-term reference image or the long-term reference image.

The coding unit determiner 120 may determine the reference motion vector by selecting the optimal reference motion vector from among the motion vectors included in the candidate motion vector list and may predict and determine the motion vector of the current prediction unit by using the selected reference motion vector.

The coding unit determiner 120 may determine the reference image of the current prediction unit indicated by the reference index of the current prediction unit. That is, the reference image of the current prediction unit may be determined according to the POC indicated by the reference index of the current prediction unit. Regardless of whether the reference image of the current prediction unit is the short-term reference image or the long-term reference image, the reference index may indicate the POC and an image that is indicated by the POC may be determined as the reference image.

Accordingly, the coding unit determiner 120 may perform motion compensation for each prediction unit, may restore each prediction unit, and thus may restore the current image including the restored prediction units. The restored prediction unit and image may become reference targets of another prediction unit and another image.

Figure 10:
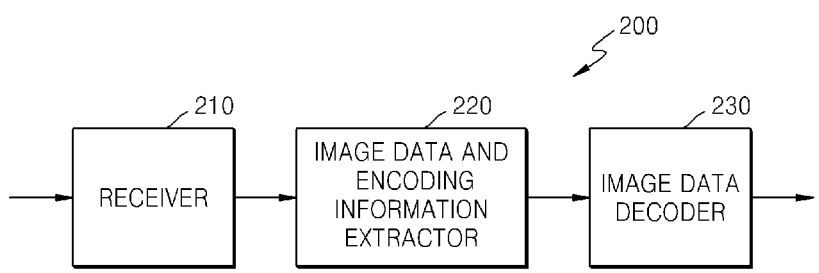
FIG. 10 is a block diagram of a video decoding apparatus based on a coding unit according to a tree structure, according to an embodiment according to the present invention.

FIG. 10 is a block diagram of a video decoding apparatus 200 based on a coding unit according to a tree structure, according to an embodiment according to the present invention.

The video decoding apparatus 200 based on the coding unit according to the tree structure includes a receiver 210, an image data and encoding information extractor 220, and an image data decoder 230. Hereinafter, for convenience of description, the video decoding apparatus 200 using video prediction based on a coding unit according to a tree structure will be referred to as the 'video decoding apparatus 200'.

Definitions of various terms, such as a coding unit, a depth, a prediction unit, a transformation unit, and information about various encoding modes, for decoding operations of the video decoding apparatus 200 are identical to those described with reference to FIG. 9 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture, a SPS, or a PPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include prediction including intra prediction and motion compensation, and inverse transformation. Inverse transformation may be performed according to a method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

In addition, the image data decoder 230 may read transformation unit information according to a tree structure for each coding unit so as to determine transform units for each coding unit and perform inverse transformation based on transformation units for each coding unit, for inverse transformation for each maximum coding unit. Via the inverse transformation, a pixel value of a spatial region of the coding unit may be restored.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. For each coding unit determined as described above, information about an encoding mode may be obtained so as to decode the current coding unit.

Also, the image data decoder 230 of the video decoding apparatus 200 shown in FIG. 10 may perform operations of the motion vector determining apparatus 10 and the video decoding unit 80 described above with reference to FIG. 1.

The image data decoder 230 may determine prediction units for motion compensation and may perform the motion compensation on respective prediction units for each respective coding unit according to a tree structure in each maximum coding unit. The image data decoder 230 may perform inverse-quantization and inverse-transformation on quantized transform coefficients of the current prediction unit and thus may restore residual data of the current block. The image data decoder 230 may perform motion compensation on the current prediction unit that is encoded via inter prediction and thus may restore the current prediction unit.

The image data decoder 230 may determine a candidate motion vector list of the current prediction unit, and when a reference image of a first candidate prediction unit from among candidate prediction units in the candidate motion vector list is different from a reference image of the current prediction unit, the image data decoder 230 may determine whether or not to use a motion vector of the first candidate prediction unit from the candidate motion vector list, based on whether each of the reference image of the current prediction unit and the reference image of the first candidate prediction unit is a short-term reference image or a long-term reference image. The first candidate prediction unit may be a neighboring prediction unit that is adjacent to the current prediction unit in a current image or may be a collocated prediction unit in a collocated image.

It is possible to determine whether each of the reference image of the current prediction unit and the reference image of the first candidate prediction unit is a short-term reference image or a long-term reference image, based on long-term reference indexes of the current prediction unit and the first candidate prediction unit.

When all of the reference image of the current prediction unit and the reference image of the first candidate prediction unit are the long-term reference images, it is possible to maintain the motion vector of the first candidate prediction unit in the candidate motion vector list without scaling a size of the motion vector of the first candidate prediction unit.

When one of the reference image of the current prediction unit and the reference image of the first candidate block is the short-term reference image, and the other one of the reference image of the current prediction unit and the reference image of the first candidate block is the long-term reference image, it is possible to determine not to use the motion vector of the first candidate prediction unit in the candidate motion vector list.

When all of the reference image of the current prediction unit and the reference image of the first candidate prediction unit are the short-term reference images, it is possible to scale the size of the motion vector of the first candidate prediction unit and then to include the motion vector of the first candidate prediction unit in the candidate motion vector list.

The image data decoder 230 may determine a reference motion vector by selecting an optimal reference motion vector from among motion vectors included in the candidate motion vector list and may predict and determine the motion vector of the current prediction unit by using the selected reference motion vector.

The image data decoder 230 may determine the reference image of the current prediction unit according to a POC indicated by the reference index of the current prediction unit. Regardless of whether the reference image of the current prediction unit is the short-term reference image or the long-term reference image, the reference index may indicate the POC and the image data decoder 230 may determine an image, which is indicated by the POC, as the reference image.

A reference prediction unit that is indicated by the motion vector of the current prediction unit in the reference image of the current prediction unit may be determined, and the reference prediction unit and the residual data of the current prediction unit may be synthesized, so that the current prediction unit may be restored.

Accordingly, the image data decoder 230 may perform motion compensation for each prediction unit, may restore each prediction unit, and thus may restore the current image including the restored prediction units. As images are restored in the aforementioned manner, a video including a sequence of the restored images may be restored. Also, the restored prediction unit and image may become reference targets of another prediction unit and another image.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of a coding unit is determined considering resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 11:
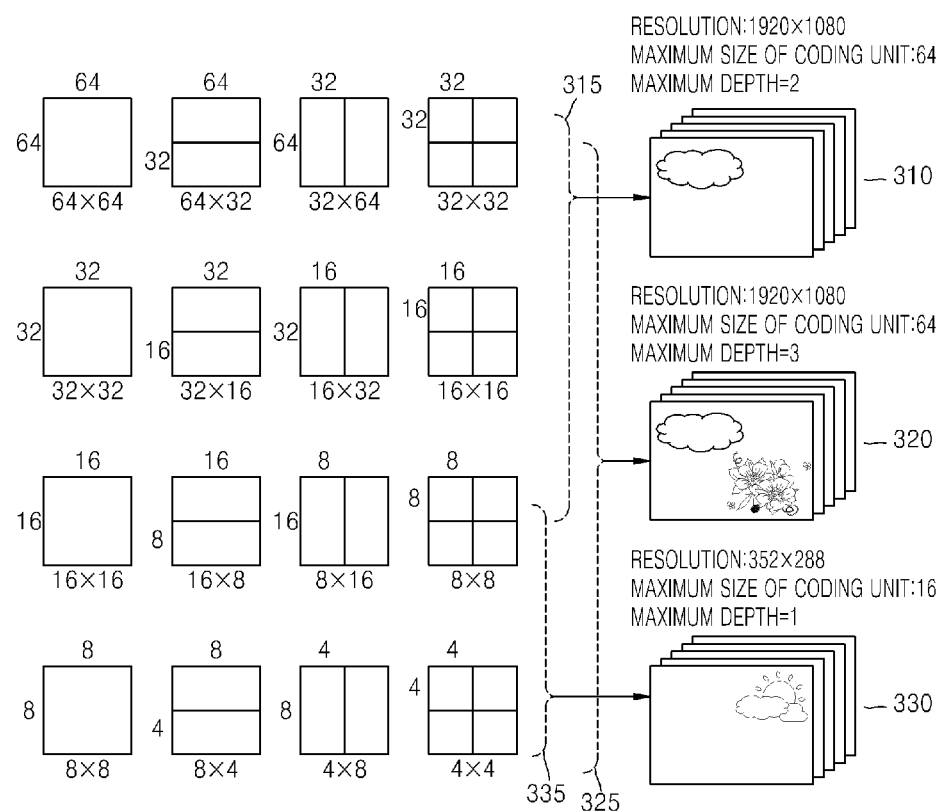
FIG. 11 is a diagram for describing a concept of coding units according to an embodiment according to the present invention.

FIG. 11 is a diagram for describing a concept of coding units according to an embodiment according to the present invention.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 11 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 12:
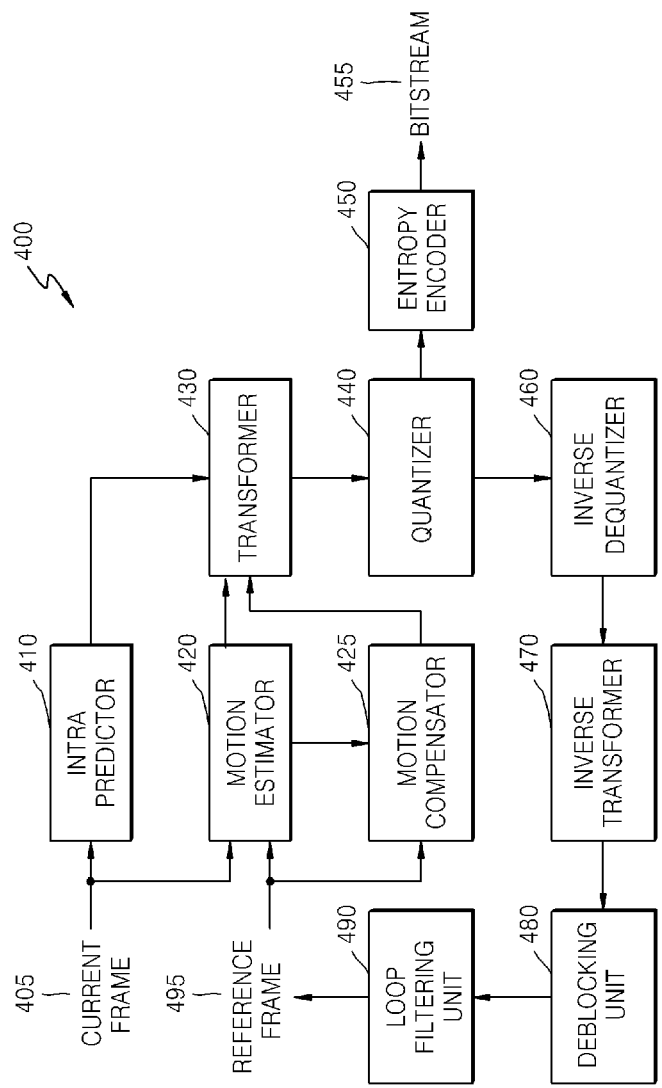
FIG. 12 is a block diagram of an image encoder based on coding units, according to an embodiment according to the present invention.

FIG. 12 is a block diagram of an image encoder 400 based on coding units, according to an embodiment according to the present invention.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as quantized transformation coefficients through a transformer 430 and a quantizer 440. The quantized transformation coefficients are restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficients may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Specifically, for motion vector prediction, PU merging, or AMVP, the motion estimator 420 may predict a motion vector of a current prediction unit (partition) by referring to a motion vector of another prediction unit.

When a reference image of a first candidate prediction unit from among the candidate prediction units in the candidate motion vector list of the current prediction unit is different from the reference frame 495 of the current prediction unit, the motion estimator 420 determines whether or not to use a motion vector of the first candidate prediction unit from the candidate motion vector list, based on whether each of the reference frame 495 of the current prediction unit and the reference image of the first candidate prediction unit is a short-term reference image or a long-term reference image.

When at least one of the reference image of the current prediction unit and the reference image of the first candidate prediction unit is the long-term reference image, the motion estimator 420 may determine to include the motion vector of the first candidate block in the candidate motion vector list while a size of the motion vector of the first candidate block is not scaled, or may determine not to use the motion vector of the first candidate block in the candidate motion vector list.

The motion estimator 420 may determine a reference motion vector by selecting an optimal reference motion vector from among motion vectors included in the candidate motion vector list and may predict and determine the motion vector of the current prediction unit by using the selected reference motion vector. The motion estimator 420 may determine a reference block that is indicated by the motion vector of the current block in the reference frame 495 of the current prediction unit and may generate residual data between the reference prediction unit and the current prediction unit. Accordingly, the motion estimator 420 may output residual data for each prediction unit.

Also, when the reference image of the first candidate prediction unit from among the candidate prediction units in the candidate motion vector list of the current prediction unit is different from the reference frame 495 of the current prediction unit, the motion compensator 425 may also determine whether or not to use or whether to exclude the motion vector of the first candidate prediction unit from the candidate motion vector list, based on whether at least one of the reference frame 495 of the current prediction unit and the reference image of the first candidate prediction unit is the long-term reference image.

The motion compensator 425 may determine a reference motion vector by selecting an optimal reference motion vector from among the motion vectors included in the candidate motion vector list and may predict and determine the motion vector of the current prediction unit by using the selected reference motion vector.

The motion compensator 425 may determine a reference prediction unit that is indicated by the motion vector of the current prediction unit in the reference frame 495, may synthesize the reference prediction unit and the residual data of the current prediction unit, and thus may restore the current prediction unit.

Accordingly, the motion compensator 425 may perform motion compensation for each prediction unit, may restore each prediction unit, and thus may restore the current image including the restored prediction units. The restored prediction unit and image may become reference targets of another prediction unit and another image.

Figure 13:
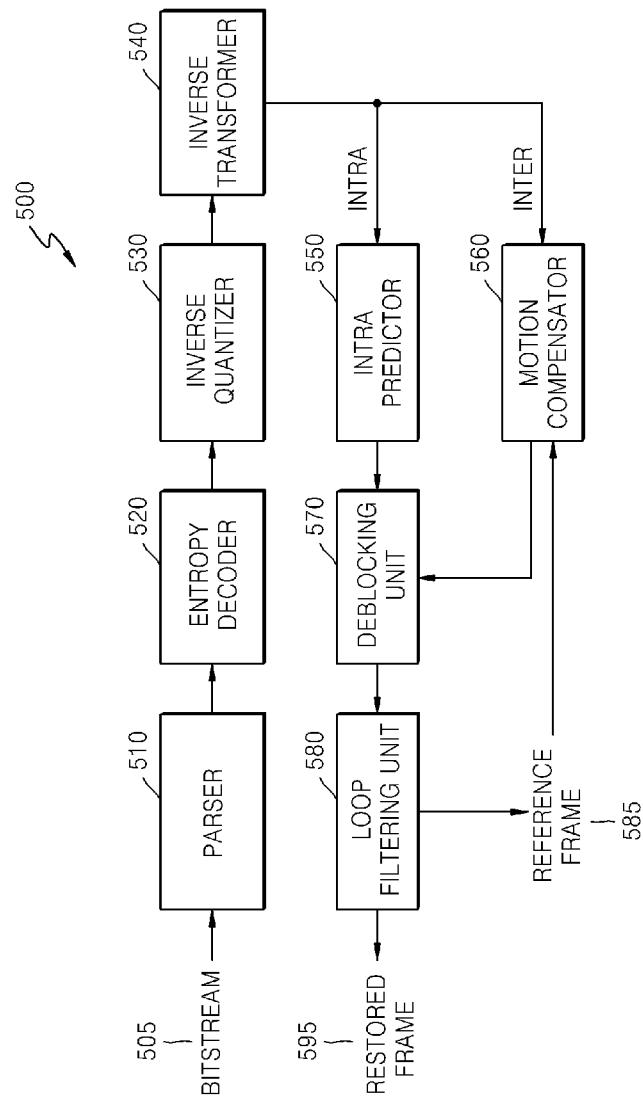
FIG. 13 is a block diagram of an image decoder based on coding units, according to an embodiment according to the present invention.

FIG. 13 is a block diagram of an image decoder 500 based on coding units, according to an embodiment according to the present invention.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510 performs an operation.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra predictor 550 and the motion compensator 560 perform operations based on partitions and a prediction mode for each of the coding units having a tree structure, and the inverse transformer 540 perform operations based on a size of a transformation unit for each coding unit.

Specifically, when a reference image of a first candidate prediction unit from among candidate prediction units in a candidate motion vector list of a current prediction unit is different from the reference frame 585 of the current prediction unit, the motion compensator 560 may determine whether or not to use or whether to exclude a motion vector of the first candidate prediction unit from the candidate motion vector list, based on whether at least one of the reference frame 585 of the current prediction unit and the reference image of the first candidate prediction unit is a long-term reference image.

The motion compensator 560 may determine a reference motion vector by selecting an optimal reference motion vector from among the motion vectors included in the candidate motion vector list and may predict and determine the motion vector of the current prediction unit by using the selected reference motion vector.

The motion compensator 560 may determine the reference frame 585 indicated by a POC according to the reference index of the current prediction unit, may determine a reference prediction unit that is indicated by the motion vector of the current prediction unit in the reference frame 585, may synthesize the reference prediction unit and the residual data of the current prediction unit, and thus may restore the current prediction unit.

Accordingly, the motion compensator 560 may perform motion compensation for each prediction unit, may restore each prediction unit, and thus may restore the current image including the restored prediction units. The restored prediction unit and image may become reference targets of another prediction unit and another image.

Figure 14:
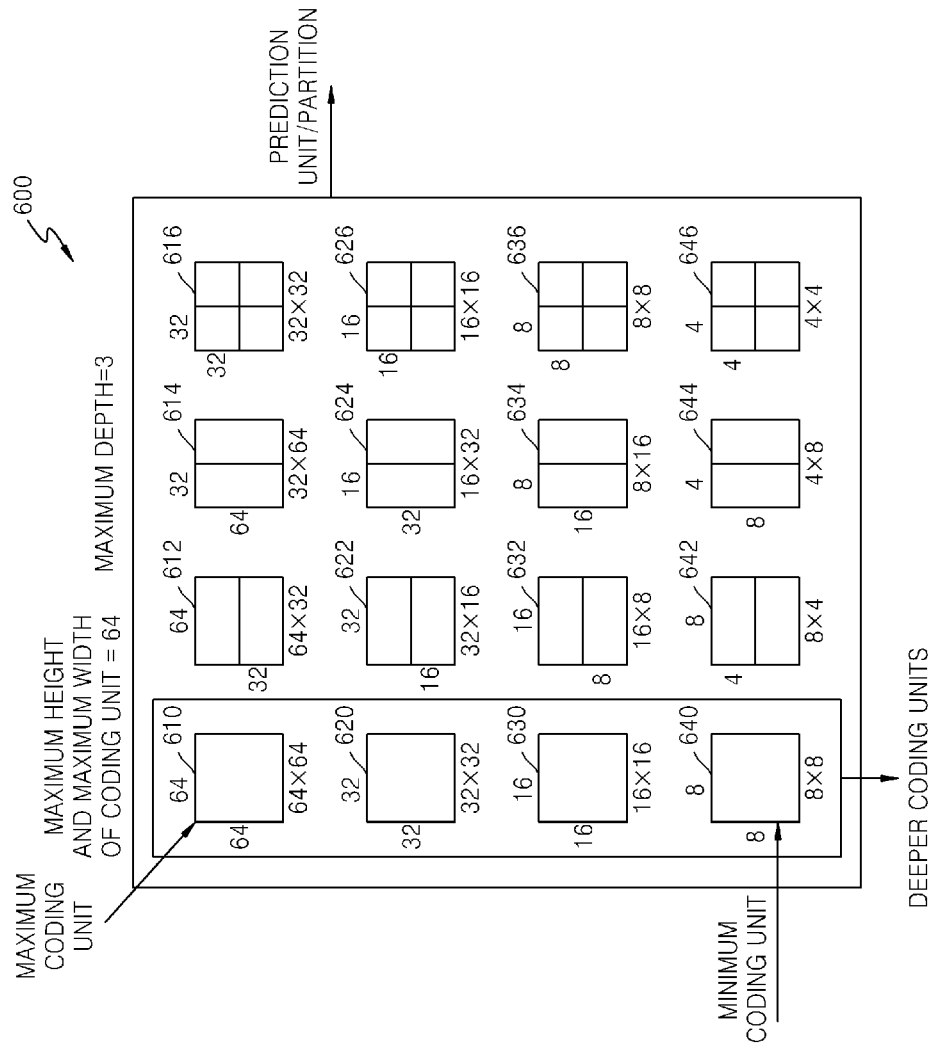
FIG. 14 is a diagram illustrating deeper coding units according to depths, and partitions, according to an embodiment according to the present invention.

FIG. 14 is a diagram illustrating deeper coding units according to depths, and partitions, according to an embodiment according to the present invention.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an embodiment according to the present invention, the maximum height and the maximum width of the coding units are each 64, and the maximum depth is 4. In this case, the maximum depth refers to a total number of times the coding unit is split from the maximum coding unit to the minimum coding unit. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3 exist. The coding unit 640 having the size of 8×8 and the depth of 3 is a minimum coding unit having a lowest depth.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 15:
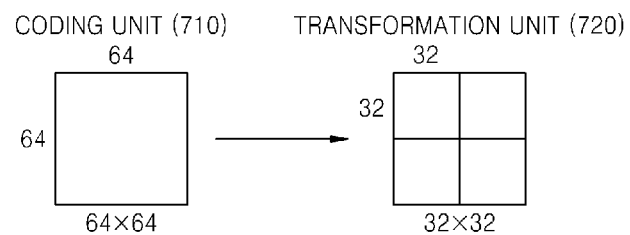
FIG. 15 is a diagram for describing a relationship between a coding unit and transformation units, according to an embodiment according to the present invention.

FIG. 15 is a diagram for describing a relationship between a coding unit 710 and transformation units 720, according to an embodiment according to the present invention.

The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 16:
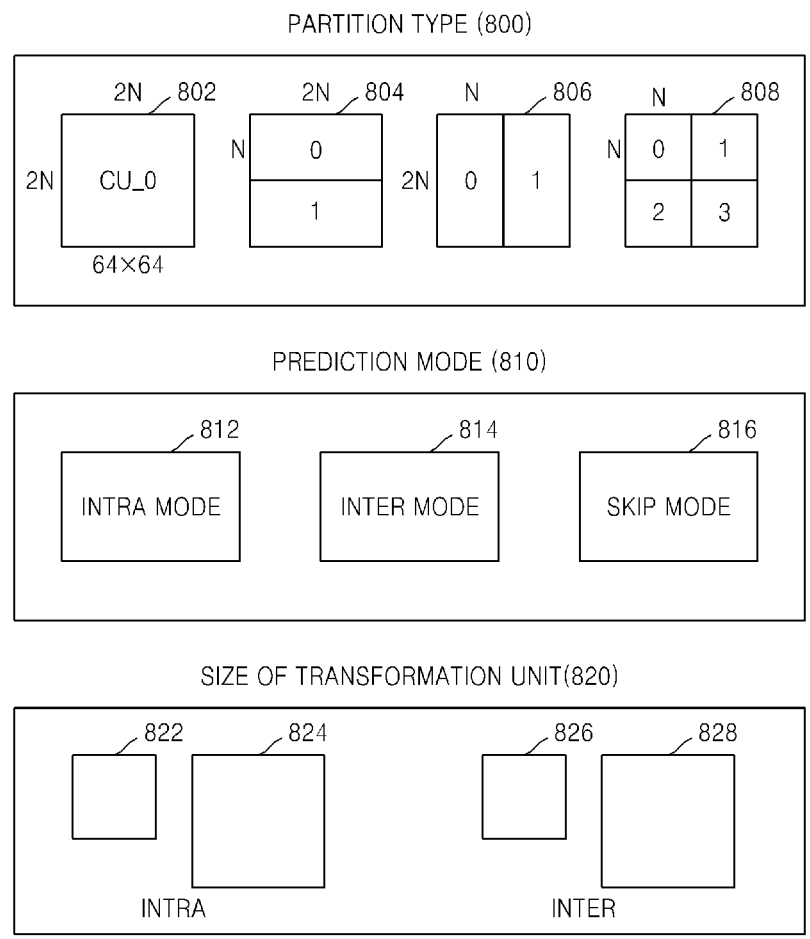
FIG. 16 is a diagram for describing encoding information of coding units corresponding to a coded depth, according to an embodiment according to the present invention.

FIG. 16 is a diagram for describing encoding information of coding units corresponding to a coded depth, according to an embodiment according to the present invention.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 17:
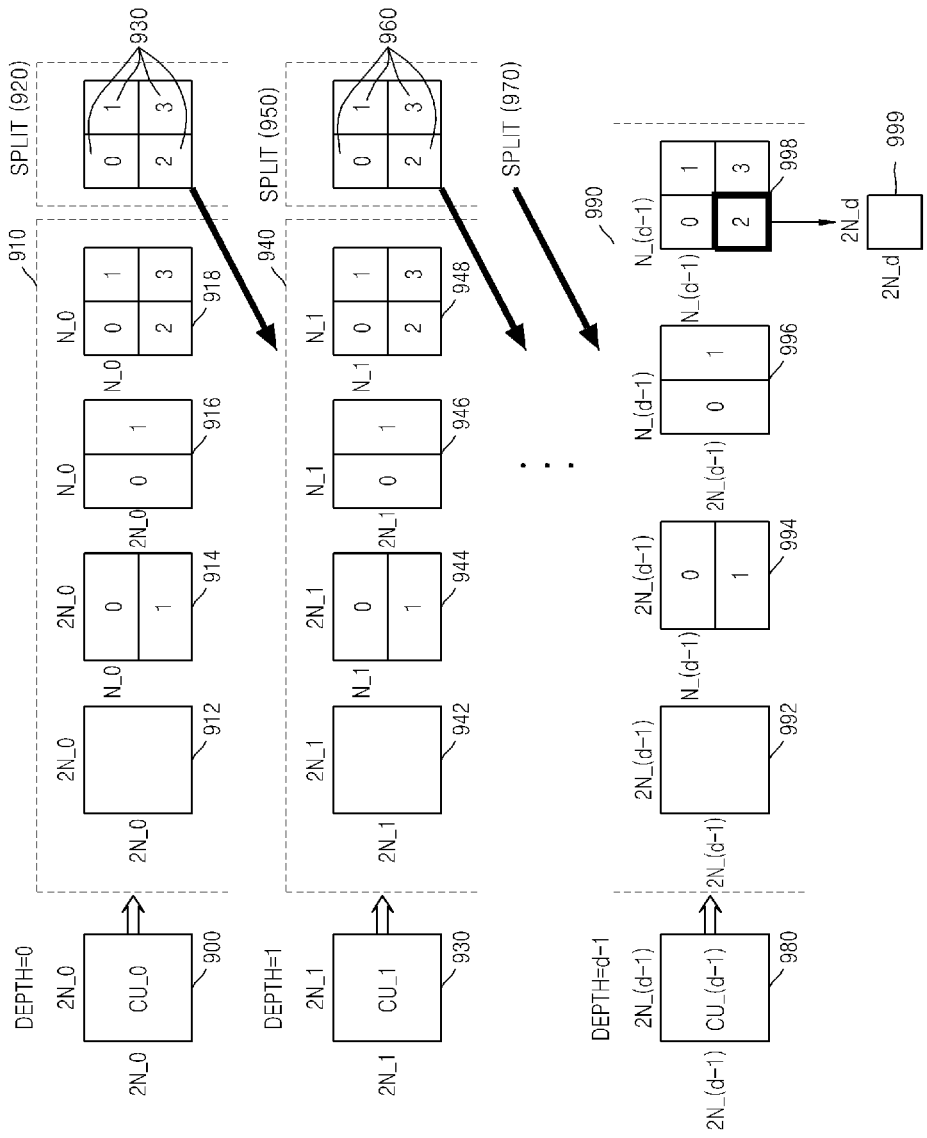
FIG. 17 is a diagram of deeper coding units according to depths, according to an embodiment according to the present invention.

FIG. 17 is a diagram of deeper coding units according to depths, according to an embodiment according to the present invention.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 17 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an embodiment according to the present invention may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 18:
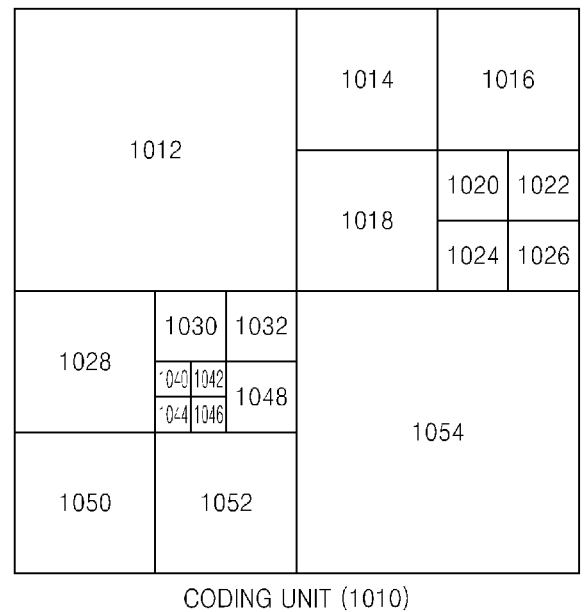
FIGS. 18 through 20 are diagrams for describing a relationship between coding units, prediction units, and transformation units, according to an embodiment according to the present invention.
Figure 19:
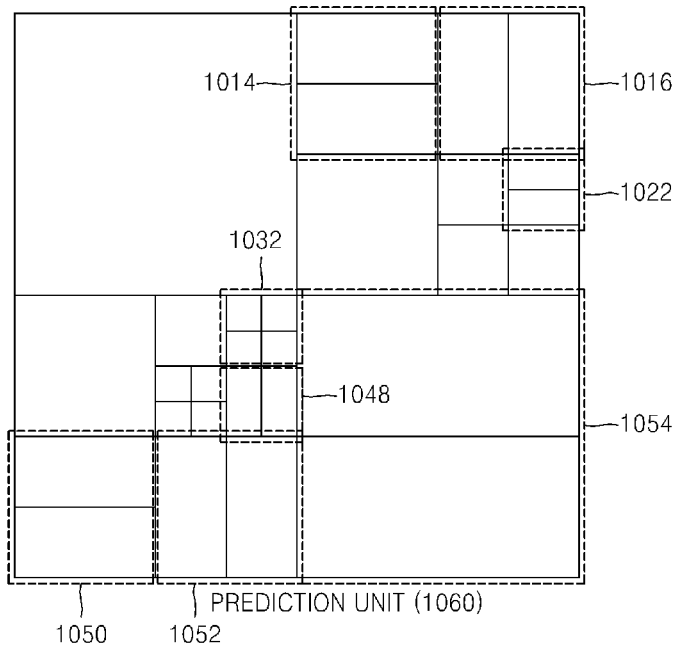
Figure 20:
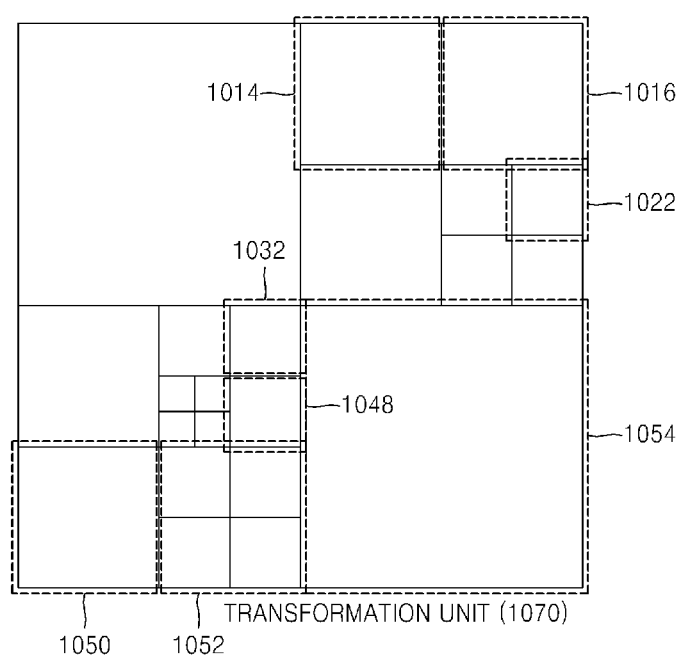

FIGS. 18 through 20 are diagrams for describing a relationship between coding units 1010, prediction units 1060, and transformation units 1070, according to an embodiment according to the present invention.

may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| | Split Information 0 (Encoding on Coding Unit having Size of 2N × 2N and Current Depth of d) | | | | |
|---|---|---|---|---|---|
| | Partition Type | | Size of Transformation Unit | | |
| Prediction Mode | Symmetrical Partition Type | Asymmetrical Partition Type | Split Information 0 of Transformation Unit | Split Information 1 of Transformation Unit | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 21:
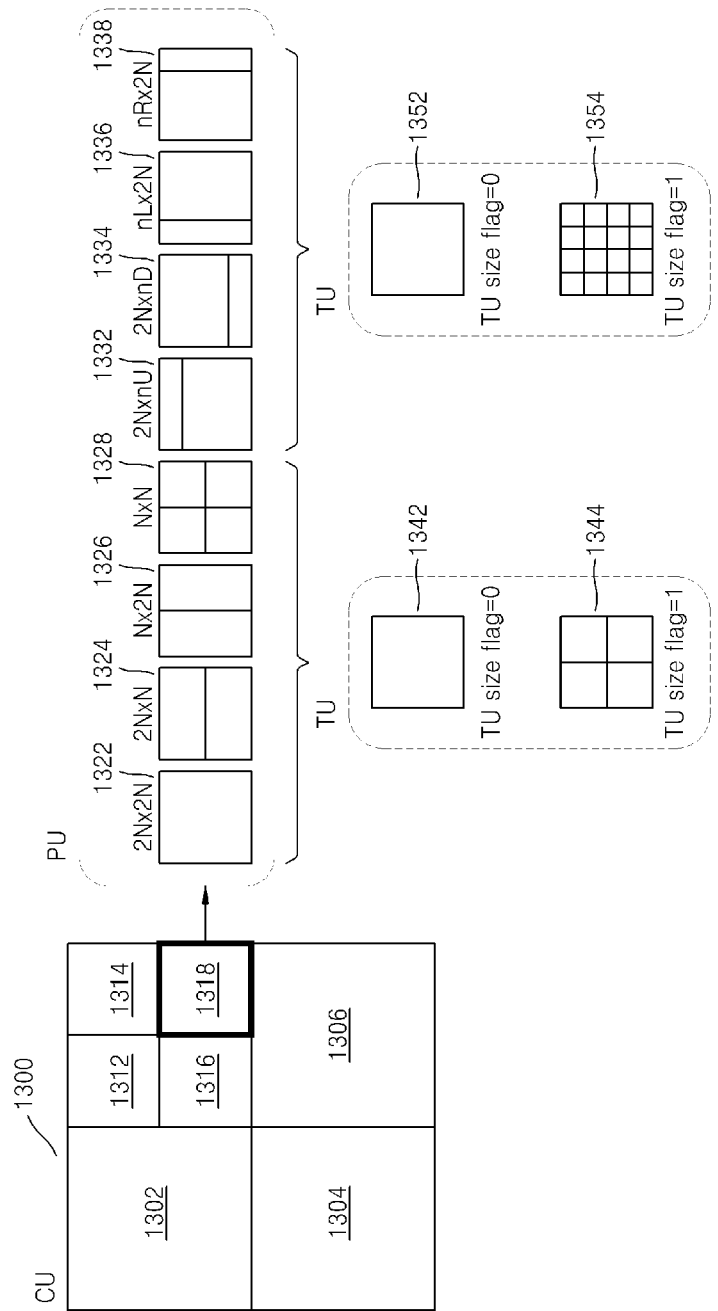
FIG. 21 is a diagram for describing a relationship between a coding unit, a prediction unit or a partition, and a transformation unit, according to encoding mode information of Table 1.

FIG. 21 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU (Transformation Unit)size flag) of a transformation unit is a type of a transformation index. The size of the transformation unit corresponding to the transformation index may be changed according to a prediction unit type or partition type of the coding unit.

For example, when the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 21, the TU size flag is a flag having a value of 0 or 1, but the TU size flag is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to an embodiment according to the present invention, together with a maximum size and minimum size of the transformation unit. According to an embodiment according to the present invention, the video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. According to an embodiment according to the present invention, the video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize}=\max(\text{MinTransformSize}, \text{RootTuSize}/(2^{\text{MaxTransformSizeIndex}})) \qquad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment according to the present invention, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize=\min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=\min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present invention is not limited thereto.

According to the video encoding method based on coding units having a tree structure as described with reference to FIGS. 9 through 21, image data of a spatial region is encoded for each coding unit of a tree structure. According to the video decoding method based on coding units having a tree structure, decoding is performed for each maximum coding unit to restore image data of a spatial region. Thus, a picture and a video that is a picture sequence may be restored. The restored video may be reproduced by a reproducing apparatus, stored in a storage medium, or transmitted through a network.

The embodiments according to the present invention may be written as computer programs and may be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

For convenience of description, a video encoding method according to the motion vector determining method, which has been described with reference to FIGS. 1 through 21, will be collectively referred to as a 'video encoding method according to the present invention'. In addition, the video decoding method according to the motion vector determining method, which has been described with reference to FIGS. 1 through 21, will be referred to as a 'video decoding method according to the present invention'.

A video encoding apparatus including the motion vector determining apparatus 10, the video encoding unit 70, the video decoding unit 80, and the video encoding apparatus 100, or the image encoder 400, which has been described with reference to FIGS. 1 through 21, will be referred to as a 'video encoding apparatus according to the present invention'. In addition, a video decoding apparatus including the motion vector determining apparatus 10, the video decoding unit 80, the video decoding apparatus 200, or the image decoder 500, which has been descried with reference to FIGS. 1 through 21, will be referred to as a 'video decoding apparatus according to the present invention'.

A computer readable recording medium storing a program, e.g., a disc 26000, according to an embodiment of the present invention will now be described in detail.

Figure 22:
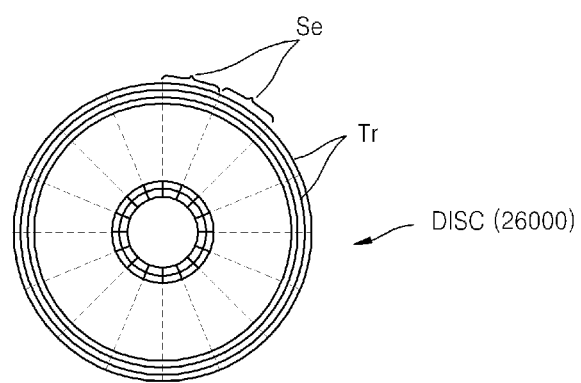
FIG. 22 illustrates a physical structure of a disc that stores a program, according to an embodiment of the present invention.

FIG. 22 illustrates a physical structure of a disc 26000 that stores a program, according to an embodiment of the present invention. The disc 26000 which is a storage medium may be a hard drive, a compact disc-read only memory (CD-ROM) disc, a Blu-ray disc, or a digital versatile disc (DVD). The disc 26000 includes a plurality of concentric tracks Tr each being divided into a specific number of sectors Se in a circumferential direction of the disc 26000. In a specific region of the disc 26000, a program that executes the motion vector determining method, the video encoding method, and the video decoding method as described above may be assigned and stored.

A computer system embodied using a storage medium that stores a program for executing a video encoding method and a video decoding method as described above will now be described with reference to FIG. 23.

Figure 23:
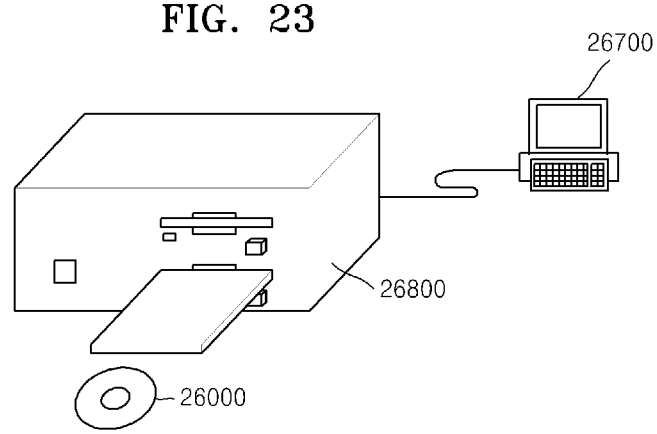
FIG. 23 illustrates a disc drive that records and reads a program by using a disc.

FIG. 23 illustrates a disc drive 26800 that records and reads a program by using a disc 26000. A computer system 26700 may store a program that executes at least one of a video encoding method and a video decoding method according to an embodiment of the present invention, in a disc 26000 via the disc drive 26800. To run the program stored in the disc 26000 in the computer system 26700, the program may be read from the disc 26000 and be transmitted to the computer system 26700 by using the disc drive 26800.

The program that executes at least one of a video encoding method and a video decoding method according to an embodiment of the present invention may be stored not only in the disc 26000 illustrated in FIG. 22 or 23 but also in a memory card, a ROM cassette, or a solid state drive (SSD).

A system to which the video encoding method and a video decoding method described above are applied will be described below.

Figure 24:
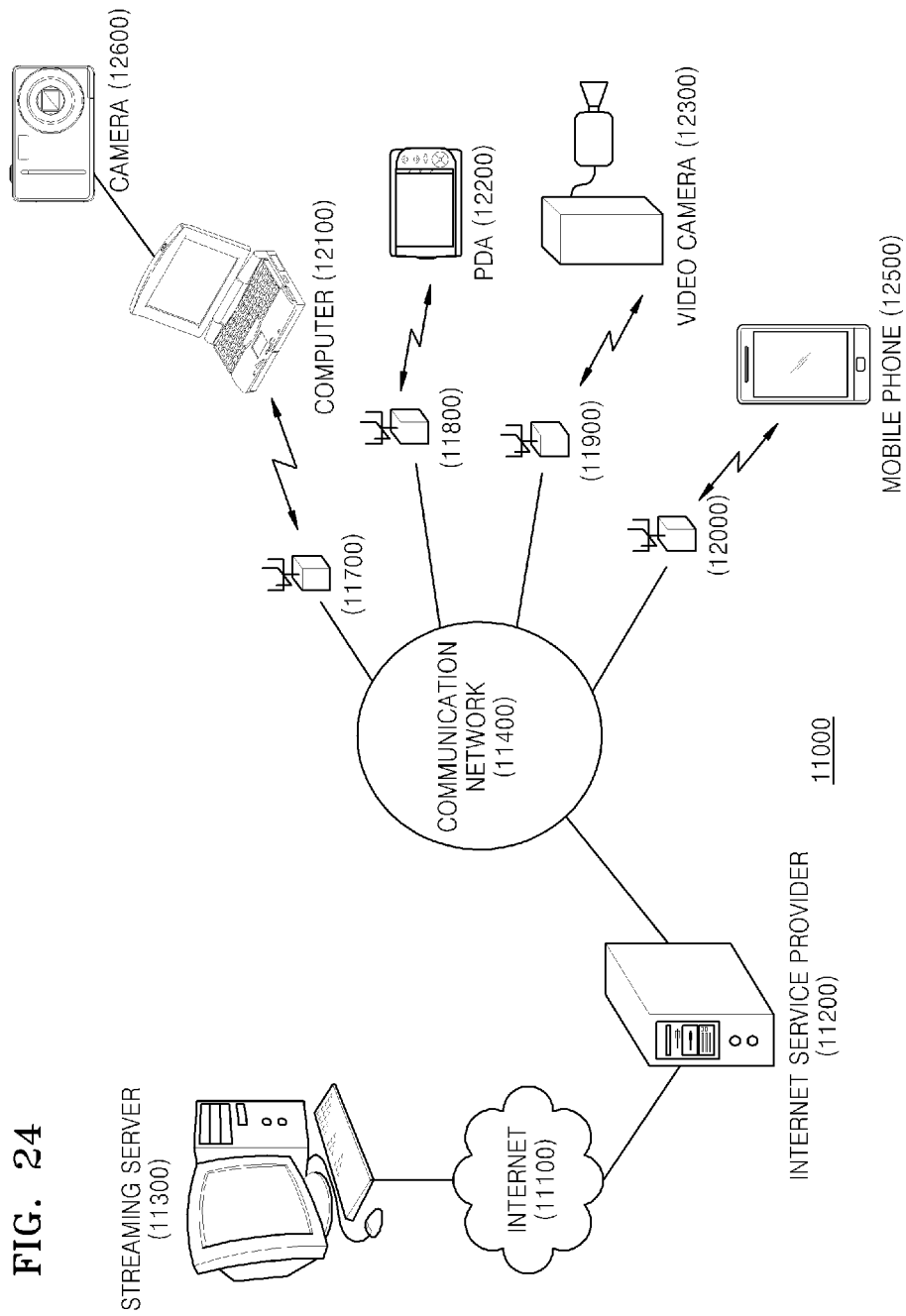
FIG. 24 illustrates an entire structure of a content supply system that provides content distribution service.

FIG. 24 illustrates an entire structure of a content supply system 11000 that provides content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 24, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300.

Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

According to an embodiment of the present invention, the content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to an embodiment of the present invention.

The mobile phone 12500 included in the content supply system 11000 according to an embodiment of the present invention will now be described in greater detail with referring to FIGS. 25 and 26.

Figure 25:
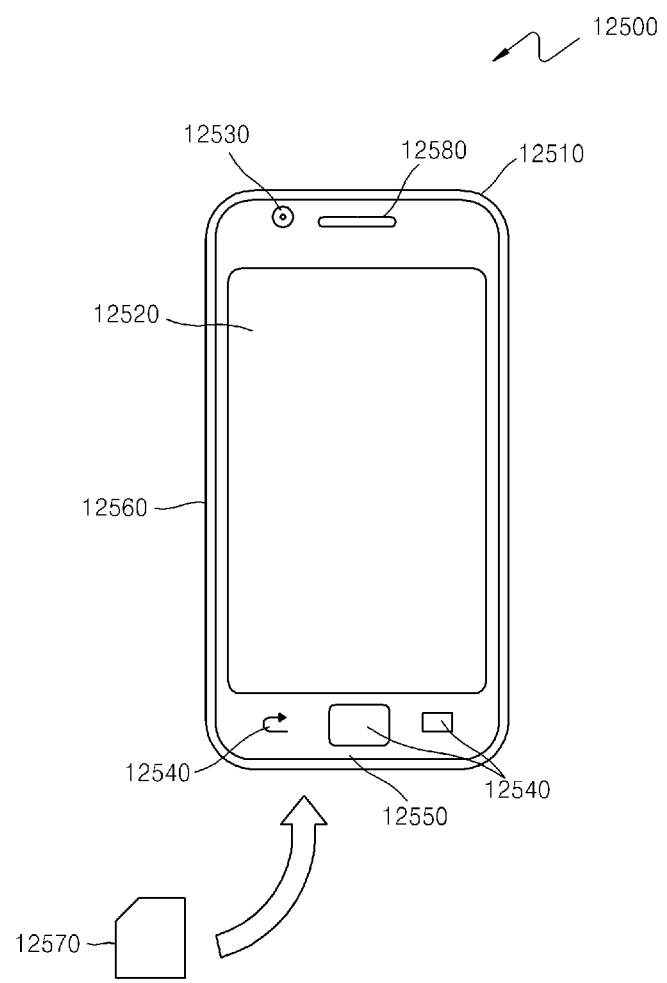
FIGS. 25 and 26 illustrate external and internal structures of a mobile phone to which a video encoding method and a video decoding method are applied, according to embodiments of the present invention.

FIG. 25 illustrates an external structure of a mobile phone 12500 to which a video encoding method and a video decoding method are applied, according to an embodiment of the present invention. The mobile phone 12500 may be a smart phone, the functions of which are not limited and a large part of the functions of which may be changed or expanded.

The mobile phone 12500 includes an internal antenna 12510 via which a radio-frequency (RF) signal may be exchanged with the wireless base station 12000 of FIG. 25, and includes a display screen 12520 for displaying images captured by a camera 12530 or images that are received via the antenna 12510 and decoded, e.g., a liquid crystal display (LCD) or an organic light-emitting diodes (OLED) screen. The smart phone 12500 includes an operation panel 12540 including a control button and a touch panel. If the display screen 12520 is a touch screen, the operation panel 12540 further includes a touch sensing panel of the display screen 12520. The smart phone 12500 includes a speaker 12580 for outputting voice and sound or another type sound output unit, and a microphone 12550 for inputting voice and sound or another type sound input unit. The smart phone 12500 further includes the camera 12530, such as a charge-coupled device (CCD) camera, to capture video and still images. The smart phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 26:
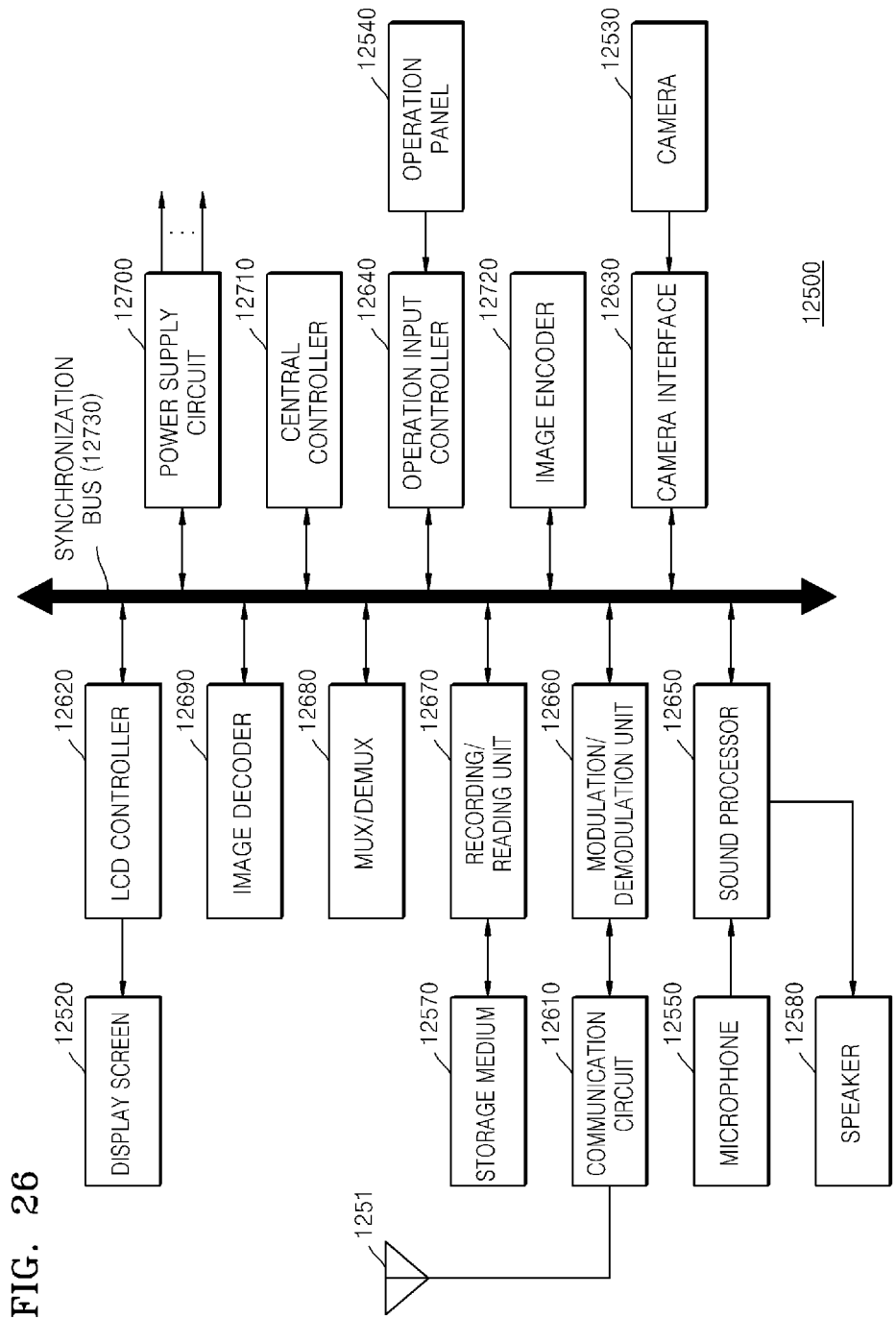

FIG. 26 illustrates an internal structure of the mobile phone 12500, according to an embodiment of the present invention. To systemically control parts of the mobile phone 12500 including the display screen 1252 and the operation panel 12540, a power supply circuit 12700, an operation input controller 12640, an image encoding unit 12720, a camera interface 12630, an LCD controller 12620, an image decoding unit 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a random access memory (RAM).

While the mobile phone 12500 transmits communication data to the outside, a digital signal is generated in the mobile phone 12500 under control of the central controller. For example, the sound processor 12650 may generate a digital sound signal, the image encoding unit 12720 may generate a digital image signal, and text data of a message may be generated via the operation panel 12540 and the operation input controller 12640. When a digital signal is delivered to the modulation/demodulation unit 12660 under control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulation/demodulation unit 12660 and the communication circuit 12610, and may be transmitted via the antenna 12510.

When a text message, e.g., email, is transmitted in a data communication mode, text data of the text message is input via the operation panel 12540 and is transmitted to the central controller 12610 via the operation input controller 12640. Under control of the central controller 12610, the text data is transformed into a transmission signal via the modulation/demodulation unit 12660 and the communication circuit 12610 and is transmitted to the wireless base station 12000 via the antenna 12510.

To transmit image data in the data communication mode, image data captured by the camera 12530 is provided to the image encoding unit 12720 via the camera interface 12630.

The captured image data may be directly displayed on the display screen 12520 via the camera interface 12630 and the LCD controller 12620.

A structure of the image encoding unit 12720 may correspond to that of the video encoding apparatus 100 described above. The image encoding unit 12720 may transform the image data received from the camera 12530 into compressed and encoded image data according to a video encoding method employed by the video encoding apparatus 100 or the image encoder 400 described above, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be delivered to the multiplexer/demultiplexer 12680.

The multiplexer/demultiplexer 12680 multiplexes the encoded image data received from the image encoding unit 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, under control of the central controller 12710.

When in the data communication mode, data of a video file accessed at an Internet website is received, a signal received from wireless base station 12000 via the antenna 12510 is output as multiplexed data via the modulation/demodulation unit 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoding unit 12690 may correspond to that of the video decoding apparatus 200 described above. The image decoding unit 12690 may decode the encoded video data to obtain restored video data and provide the restored video data to the display screen 12520 via the LCD controller 12620, according to a video decoding method employed by the video decoding apparatus 200 or the image decoder 500 described above.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an embodiment of the present invention, may be a transceiving terminal including only the video encoding apparatus, or may be a transceiving terminal including only the video decoding apparatus.

Figure 27:
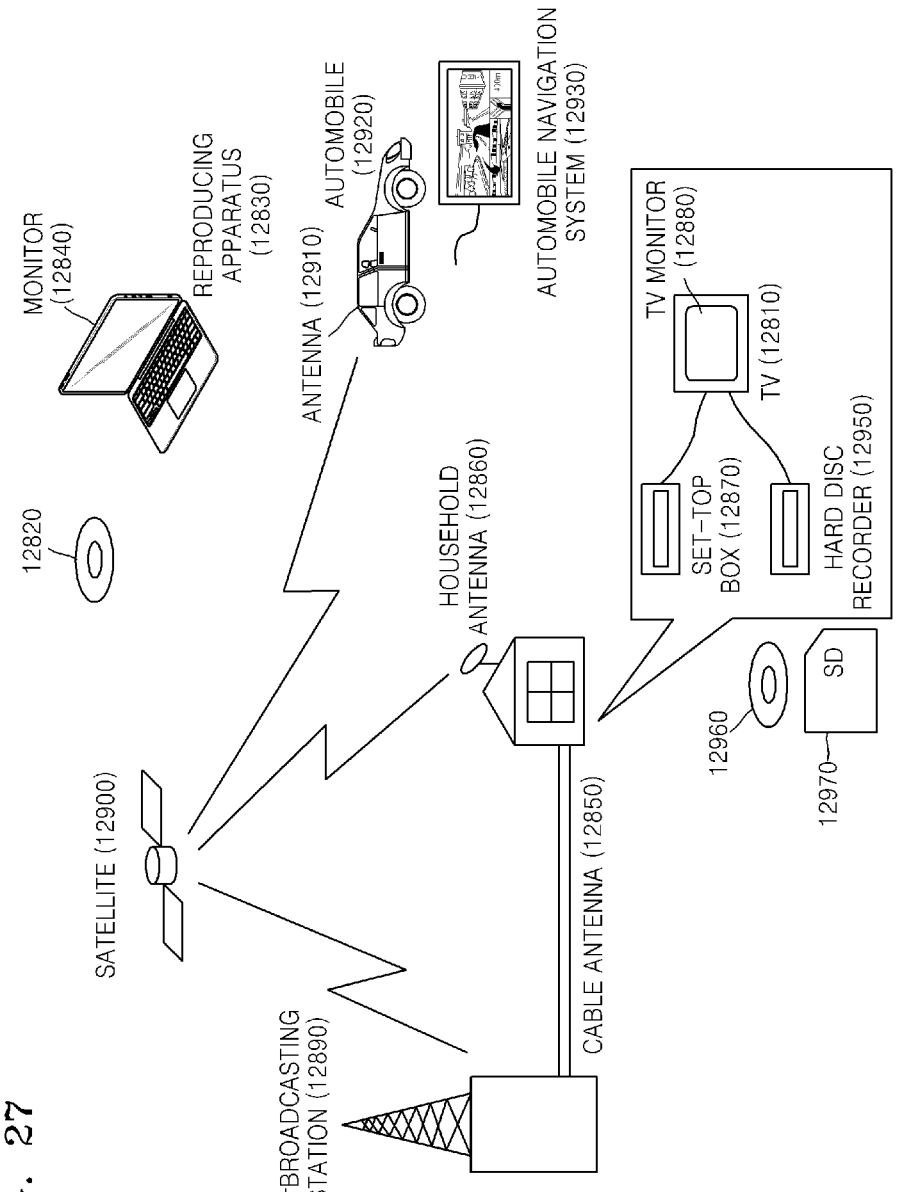
FIG. 27 illustrates a digital broadcasting system employing a communication system, according to an embodiment of the present invention.

A communication system according to the present invention is not limited to the communication system described above with reference to FIG. 25. For example, FIG. 27 illustrates a digital broadcasting system employing a communication system, according to an embodiment of the present invention. The digital broadcasting system of FIG. 27 may receive a digital broadcast transmitted via a satellite or a terrestrial network by using a video encoding apparatus and a video decoding apparatus according to an embodiment of the present invention.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to an embodiment of the present invention is implemented in a reproducing apparatus 12830, the reproducing apparatus 12830 may parse and decode an encoded video stream recorded on a storage medium 12820, such as a disc or a memory card to restore digital signals. Thus, the restored video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to an embodiment of the present invention may be installed. Data output from the set-top box 12870 may also be reproduced on a TV monitor 12880.

As another example, a video decoding apparatus according to an embodiment of the present invention may be installed in the TV receiver 12810 instead of the set-top box 12870.

An automobile 12920 including an appropriate antenna 12910 may receive a signal transmitted from the satellite 12900 or the wireless base station 11700. A decoded video may be reproduced on a display screen of an automobile navigation system 12930 built in the automobile 12920.

A video signal may be encoded by a video encoding apparatus according to an embodiment of the present invention and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to an embodiment of the present invention, a video signal recorded on the DVD disc 12960, the SD card 12970, or another storage medium may be reproduced on the TV monitor 12880.

The automobile navigation system 12930 may not include the camera 12530, the camera interface 12630, and the image encoding unit 12720 of FIG. 27. For example, the computer 12100 and the TV receiver 12810 may not be included in the camera 12530, the camera interface 12630, and the image encoding unit 12720 of FIG. 27.

Figure 28:
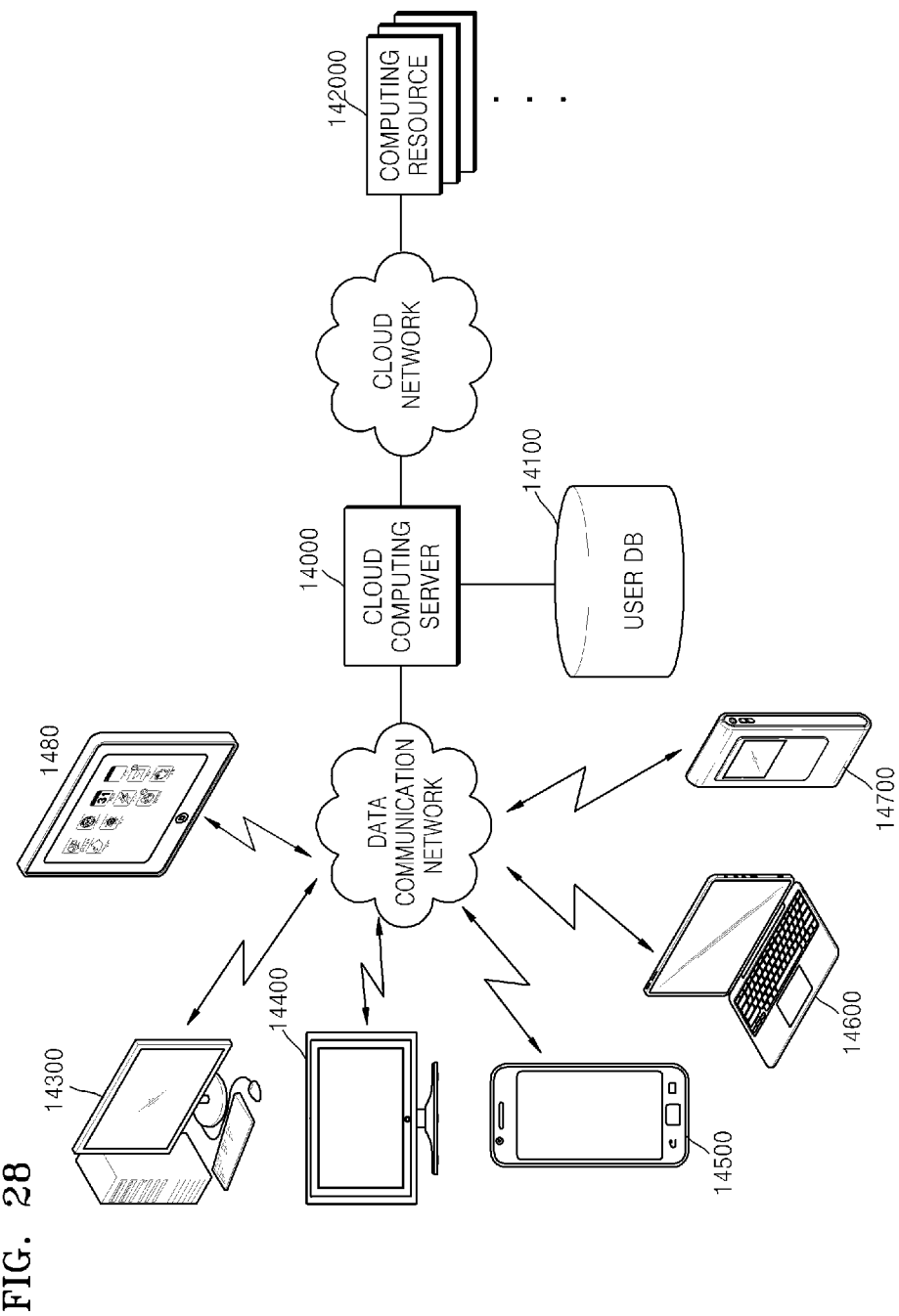
FIG. 28 illustrates a network structure of a cloud computing system using a video encoding apparatus and a video decoding apparatus, according to an embodiment of the present invention.

FIG. 28 illustrates a network structure of a cloud computing system using a video encoding apparatus and a video decoding apparatus, according to an embodiment of the present invention.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point of time.

A user terminal of a specified service user is connected to the cloud computing server 14100 via a data communication network including the Internet and a mobile telecommunication network. User terminals may be provided cloud computing services, and particularly video reproduction services, from the cloud computing server 14100. The user terminals may be various types of electronic devices capable of being connected to the Internet, e.g., a desk-top PC 14300, a smart TV 14400, a smart phone 14500, a notebook computer 14600, a portable multimedia player (PMP) 14700, a tablet PC 14800, and the like.

The cloud computing server 14100 may combine the plurality of computing resources 14200 distributed in a cloud network and provide user terminals with a result of the combining. The plurality of computing resources 14200 may include various data services, and may include data uploaded from user terminals. As described above, the cloud computing server 14100 may provide user terminals with desired services by combining video database distributed in different regions according to the virtualization technology.

User information about users who has subscribed to a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14100 searches for and reproduces this video service, based on the user DB 14100. When the smart phone 14500 receives a video data stream from the cloud computing server 14100, a process of reproducing video by decoding the video data stream is similar to an operation of the mobile phone 12500 described above with reference to FIG. 27.

The cloud computing server 14100 may refer to a reproduction history of a desired video service, stored in the user DB 14100. For example, the cloud computing server 14100 receives a request to reproduce a video stored in the user DB 14100, from a user terminal. If this video was being reproduced, then a method of streaming this video, performed by the cloud computing server 14100 may vary according to the request from the user terminal, i.e., according to whether the video will be reproduced, starting from a start thereof or a pausing point thereof. For example, if the user terminal requests to reproduce the video, starting from the start thereof, the cloud computing server 14100 transmits streaming data of the video starting from a first frame thereof to the user terminal. If the user terminal requests to reproduce the video, starting from the pausing point thereof, the cloud computing server 14100 transmits streaming data of the video starting from a frame corresponding to the pausing point, to the user terminal.

In this case, the user terminal may include a video decoding apparatus as described above with reference to FIGS. 1 to 23. As another example, the user terminal may include a video encoding apparatus as described above with reference to FIGS. 1 to 23. Alternatively, the user terminal may include both the video decoding apparatus and the video encoding apparatus as described above with reference to FIGS. 1 to 23.

Various applications of a video encoding method, a video decoding method, a video encoding apparatus, and a video decoding apparatus according to embodiments of the present invention described above with reference to FIGS. 1 to 21 have been described above with reference to FIGS. 22 to 28. However, methods of storing the video encoding method and the video decoding method in a storage medium or methods of implementing the video encoding apparatus and the video decoding apparatus in a device according to various embodiments of the present invention, are not limited to the embodiments described above with reference to FIGS. 22 to 28.

While the present invention has been particularly shown and described with reference to exemplary embodiments thereof, it will be understood by those of ordinary skill in the art that various changes in form and details may be made therein without departing from the spirit and scope according to the present invention as defined by the following claims.

The invention claimed is:

1. An apparatus for decoding an image, the apparatus comprising at least one hardware processor configured to implement:
   a reference picture comparer configured to determine whether both of a reference picture of a candidate block and a reference picture of a current block are long-term reference pictures, wherein the candidate block is from among a plurality of candidate blocks spatially adjacent to the current block; and
   a motion vector determiner configured to, when both of the reference picture of the candidate block and the reference picture of the current block are long-term reference pictures, obtain a spatial motion vector prediction candidate without scaling a motion vector of the candidate block, when both of the reference picture of the current block and the reference picture of the candidate block are different short-term reference pictures, obtain the spatial motion vector prediction candidate by scaling the motion vector of the candidate block, determine a motion vector prediction of the current block from among motion vector prediction candidates comprising the spatial motion vector prediction candidate, and generate the motion vector of the current block by using the motion vector prediction.

\* \* \* \* \*